(12) United States Patent
Koike et al.

(10) Patent No.: US 11,088,359 B2
(45) Date of Patent: Aug. 10, 2021

(54) SECONDARY BATTERY-USE ANODE AND METHOD OF MANUFACTURING THE SAME, SECONDARY BATTERY AND METHOD OF MANUFACTURING THE SAME, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Yosuke Koike, Kanagawa (JP); Yoshihide Nagata, Kanagawa (JP); Kazuaki Takada, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/575,117

(22) PCT Filed: Jul. 26, 2016

(86) PCT No.: PCT/JP2016/071806
§ 371 (c)(1),
(2) Date: Nov. 17, 2017

(87) PCT Pub. No.: WO2017/026269
PCT Pub. Date: Feb. 16, 2017

(65) Prior Publication Data
US 2018/0145312 A1    May 24, 2018

(30) Foreign Application Priority Data
Aug. 10, 2015  (JP) .............................. JP2015-158111

(51) Int. Cl.
*H01M 4/133* (2010.01)
*H01M 4/1393* (2010.01)
(Continued)

(52) U.S. Cl.
CPC ........... *H01M 4/133* (2013.01); *H01M 4/134* (2013.01); *H01M 4/1393* (2013.01);
(Continued)

(58) Field of Classification Search
CPC .... H01M 4/133; H01M 4/1393; H01M 4/386; H01M 4/587; H01M 4/623; H01M 4/388; H01M 10/0525; H01M 10/069; H01M 4/134; H01M 4/1395; H01M 4/364; H01M 4/366; H01M 4/62
See application file for complete search history.

(56) References Cited

U.S. PATENT DOCUMENTS

2010/0136432 A1* 6/2010 Kim ...................... H01M 4/133
429/231.8
2012/0171571 A1* 7/2012 Kurakane ............. H01M 4/133
429/224
(Continued)

FOREIGN PATENT DOCUMENTS

| CN | 102804456 | 11/2012 |
| CN | 103313937 | 9/2013 |

(Continued)

OTHER PUBLICATIONS

International Search Report prepared by the Japan Patent Office dated Sep. 7, 2016, for International Application No. PCT/JP2016/071806.

(Continued)

*Primary Examiner* — Jimmy Vo
(74) *Attorney, Agent, or Firm* — Sheridan Ross P.C.

(57) ABSTRACT

A secondary battery includes a cathode, an anode, and an electrolytic solution. The anode includes a first anode active material, a second anode active material, and an anode binder. The first anode active material includes a first central portion and a first coating portion. The first central portion includes a material that includes silicon as a constituent element, and the first coating portion is provided on a surface of the first central portion and includes one or both (Continued)

of a polyacrylate salt and a carboxymethylcellulose salt. The second anode active material includes a material that includes carbon as a constituent element. The anode binder includes one or more of polyvinylidene fluoride, polyimide, and aramid.

32 Claims, 9 Drawing Sheets

(51) Int. Cl.
| | |
|---|---|
| *H01M 4/62* | (2006.01) |
| *H01M 4/36* | (2006.01) |
| *H01M 4/134* | (2010.01) |
| *H01M 4/1395* | (2010.01) |
| *H01M 4/587* | (2010.01) |
| *H01M 4/38* | (2006.01) |
| *H01M 10/0525* | (2010.01) |
| *H01M 10/0569* | (2010.01) |

(52) U.S. Cl.
CPC ......... *H01M 4/1395* (2013.01); *H01M 4/364* (2013.01); *H01M 4/366* (2013.01); *H01M 4/386* (2013.01); *H01M 4/587* (2013.01); *H01M 4/62* (2013.01); *H01M 4/623* (2013.01); *H01M 10/0525* (2013.01); *H01M 10/0569* (2013.01); *H01M 4/388* (2013.01); *Y02P 70/50* (2015.11)

(56) References Cited

U.S. PATENT DOCUMENTS

| | | | | |
|---|---|---|---|---|
| 2013/0216907 | A1* | 8/2013 | Rayner | B22F 9/04 |
| | | | | 429/211 |
| 2014/0050975 | A1* | 2/2014 | Cha | H01M 4/36 |
| | | | | 429/209 |
| 2014/0050983 | A1* | 2/2014 | Kim | H01M 4/133 |
| | | | | 429/213 |
| 2014/0322611 | A1* | 10/2014 | Lee | H01M 4/485 |
| | | | | 429/231.8 |
| 2015/0140423 | A1 | 5/2015 | Brown et al. | |
| 2015/0372306 | A1 | 12/2015 | Muraoka et al. | |
| 2016/0079593 | A1* | 3/2016 | Meng | H01M 4/366 |
| | | | | 429/220 |
| 2017/0033352 | A1* | 2/2017 | Mizutani | H01M 10/0562 |

FOREIGN PATENT DOCUMENTS

| | | |
|---|---|---|
| CN | 104471752 | 3/2015 |
| JP | 2006-196338 | 7/2006 |
| JP | 2012-079471 | 4/2012 |
| JP | 2012-164624 A | 8/2012 |
| JP | 2013-084575 | 5/2013 |
| KR | 10-2015-0027093 | 3/2015 |
| WO | WO 2013/175241 A1 | 11/2013 |
| WO | WO 2014/132579 A1 | 9/2014 |
| WO | WO 2015/098023 A1 | 7/2015 |
| WO | WO 2015/107581 A1 | 7/2015 |

OTHER PUBLICATIONS

Official Action (no translation available) for Japanese Patent Application No. 2017-534168, dated Mar. 12, 2019, 4 pages.
Official Action (no English translation available) for Korean Patent Application No. 10-2017-7033476, dated Nov. 27, 2019, 11 pages.
Official Action (no English translation available) for Chinese Patent Application No. 201680029770.6, dated Jan 3, 2020, 14 pages.
Official Action (no English translation available) for Chinese Patent Application No. 201680029770.6, dated Jul. 22, 2020, 16 pages.

* cited by examiner

SECONDARY BATTERY-USE ANODE AND METHOD OF MANUFACTURING THE SAME, SECONDARY BATTERY AND METHOD OF MANUFACTURING THE SAME, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

This application is a national stage application under 35 U.S.C. 371 and claims the benefit of PCT Application No. PCT/JP2016/071806 having an international filing date of 26 Jul. 2016, which designated the United States, which PCT application claimed the benefit of Japanese Patent Application No. 2015-158111 filed 10 Aug. 2015, and the disclosures of which are incorporated herein by reference in their entirety.

TECHNICAL FIELD

The present technology relates to an anode used for a secondary battery and a method of manufacturing the same, to a secondary battery using the anode and a method of manufacturing the same, and to a battery pack, an electric vehicle, an electric power storage system, an electric power tool, and an electronic apparatus each of which uses the secondary battery.

BACKGROUND ART

Various electronic apparatuses such as mobile phones and personal digital assistants (PDAs) have been widely used, and it has been demanded to further reduce size and weight of the electronic apparatuses and to achieve their longer lives. Accordingly, small and light-weight secondary batteries that have ability to achieve high energy density have been developed as power sources for the electronic apparatuses.

Applications of the secondary batteries are not limited to the electronic apparatuses described above, and it has been also considered to apply the secondary batteries to various other applications. Examples of such other applications include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant and a secondary battery that utilizes precipitation and dissolution of an electrode reactant.

The secondary battery includes a cathode, an anode, and electrolytic solution. The anode includes an anode active material, an anode binder, etc. The configuration of the anode exerts a large influence on battery characteristics. Accordingly, various studies have been conducted on the configuration of the anode.

Specifically, in order to reduce irreversible capacity, an anode active material in which a resin coating film including a polyacrylic acid is provided on a silicon oxide particle is used (for example, refer to PTL 1).

CITATION LIST

Patent Literature

PTL 1: Japanese Unexamined Patent Application Publication No. 2012-164624

SUMMARY OF THE INVENTION

In association with higher performance and more multi-functionality of electronic apparatuses and other apparatuses described above, the electronic apparatuses and the other apparatuses are more frequently used, and usage environment thereof expands. For this reason, there is still room for improvement in battery characteristics of the secondary batteries.

It is therefore desirable to provide a secondary battery-use anode and a method of manufacturing the same, a secondary battery and a method of manufacturing the same, a battery pack, an electric vehicle, an electric power storage system, an electric power tool, and an electronic apparatus each of which makes it possible to achieve superior battery characteristics.

A secondary battery-use anode according to an embodiment of the present technology includes a first anode active material, a second anode active material, and an anode binder. The first anode active material includes a first central portion and a first coating portion. The first central portion includes a material that includes silicon as a constituent element, and the first coating portion is provided on a surface of the first central portion and includes one or both of a polyacrylate salt and a carboxymethylcellulose salt. The second anode active material includes a material that includes carbon as a constituent element. The anode binder includes one or more of polyvinylidene fluoride, polyimide, and aramid.

A method of manufacturing a secondary battery-use anode according to an embodiment of the present technology is to manufacture the anode by the following procedure in manufacturing of the anode used for a secondary battery. An aqueous dispersion liquid is prepared. The aqueous dispersion liquid includes a first central portion, one or both of a polyacrylate salt and carboxymethylcellulose salt, and an aqueous solvent. The first central portion includes a material that includes silicon as a constituent element. A first anode active material is separated from the aqueous dispersion liquid. In the first anode active material, a first coating portion including one or both of the polyacrylate salt and the carboxymethylcellulose salt is formed on a surface of the first central portion. A nonaqueous dispersion liquid is prepared. The nonaqueous dispersion liquid includes the first anode active material, a second anode active material, an anode binder, and a nonaqueous solvent. The second anode active material includes a material that includes carbon as a constituent element. The anode binder includes one or more of polyvinylidene fluoride, polyimide, and aramid. The anode is manufactured with use of the nonaqueous dispersion liquid.

A secondary battery according to an embodiment of the present technology includes a cathode, an anode, and an electrolytic solution, and the anode has a configuration similar to that of the foregoing secondary battery-use anode according to the embodiment of the present technology.

A method of manufacturing a secondary battery according to an embodiment of the present technology uses, in manufacturing of an anode used for the secondary battery together with a cathode and an electrolytic solution, processes similar to those in the foregoing method of manufacturing the secondary battery-use anode according to the embodiment of the present technology.

A battery pack, an electric vehicle, an electric power storage system, an electric power tool, and an electronic apparatus according to respective embodiments of the present technology each include a secondary battery, and the secondary battery has a configuration similar to that of the foregoing secondary battery according to the embodiment of the present technology.

According to the secondary battery-use anode and the secondary battery of the respective embodiments of the present technology, the anode includes the first anode active material, the second anode active material, and the anode binder, and the first anode active material, the second anode active material, and the anode binder have the foregoing respective configurations, which makes it possible to achieve superior battery characteristics. Moreover, in each of the battery pack, the electric vehicle, the electric power storage system, the electric power tool, and the electronic apparatus of the respective embodiments of the present technology, similar effects are achievable.

Moreover, according to the method of manufacturing the secondary battery-use anode and the method of manufacturing the secondary battery of the respective embodiments of the present technology, the aqueous dispersion liquid and the nonaqueous dispersion liquid mentioned above are prepared in this order, and thereafter, the anode is manufactured with use of the nonaqueous water dispersion liquid. Accordingly, the secondary battery-use anode or the secondary battery of the embodiment of the present technology is manufactured. This makes it possible to achieve superior battery characteristics.

Note that effects described here are non-limiting. Effects achieved by the present technology may be one or more of effects described in the present technology.

MODES FOR CARRYING OUT THE INVENTION

In the following, some embodiments of the present technology are described in detail with reference to the drawings. It is to be noted that description is given in the following order.

1. Secondary Battery-use Anode and Method of Manufacturing Same (First Embodiment)
 1-1. Secondary Battery-use Anode
 1-2. Method of Manufacturing Secondary Battery-use Anode
 1-3. Action and Effects
2. Secondary Battery-use Anode and Method of Manufacturing Same (Second Embodiment)
 2-1. Secondary Battery-use Anode
 2-2. Method of Manufacturing Secondary Battery-use Anode
 2-3. Action and Effects
3. Secondary Battery and Method of Manufacturing Same
 3-1. Lithium-ion Secondary battery (Cylindrical Type)
 3-2. Lithium-ion Secondary Battery (Laminated Film Type)
 3-3. Lithium Metal Secondary Battery
4. Application of Secondary Battery
 4-1. Battery Pack (Single Battery)
 4-2. Battery Pack (Assembled Battery)
 4-3. Electric Vehicle
 4-4. Electric Power Storage System
 4-5. Electric Power Tool 1. Secondary Battery-use Anode and Method of Manufacturing Same (First Embodiment First, description is given of a secondary battery-use anode and a method of manufacturing the same according to a first embodiment of the present technology.

(1-1. Secondary Battery-Use Anode)

Hereinafter, the secondary battery-use anode (hereinafter simply referred to as "anode") is used for, for example, an electrochemical device such as a secondary battery. The kind of the secondary battery using the anode is not particularly limited, but is, for example, a lithium-ion secondary battery.

Figure 1:
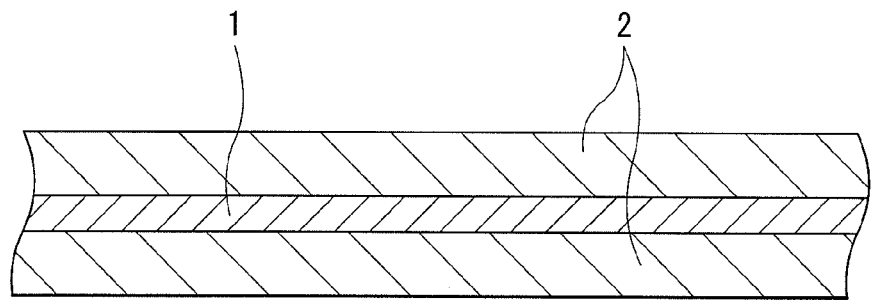
FIG. 1 is a cross-sectional view of a configuration of a secondary battery-use anode according to a first embodiment of the present technology.

FIG. 1 illustrates a cross-sectional configuration of the anode. The anode includes, for example, an anode current collector 1 and an anode active material layer 2 provided on the anode current collector 1.

It is to be noted that the anode active material layer 2 may be provided on a single surface of the anode current collector 1, or the anode active material layers 2 may be provided on both surfaces of the anode current collector 1. FIG. 1 illustrates, for example, a case where the anode active material layers 2 are provided on both surfaces of the anode current collector 1.

[Anode Current Collector]

The anode current collector 1 includes, for example, one or more of conductive materials. The kinds of conductive materials are not particularly limited, but are, for example, metal materials such as copper, aluminum, nickel, and stainless steel. An alloy including two or more of the metal materials may be used as the conductive material. It is to be noted that the anode current collector 1 may be configured of a single layer or may be configured of multiple layers.

A surface of the anode current collector 1 is preferably roughened. This makes it possible to improve adhesibility of the anode active material layer 2 with respect to the anode current collector 1 by a so-called anchor effect. In this case, it may be only necessary to roughen the surface of the anode current collector 1 at least in a region facing the anode active material layer 2. Examples of a roughening method include a method of forming fine particles with use of electrolytic treatment. Through the electrolytic treatment, fine particles are formed on the surface of the anode current collector 1 in an electrolytic bath by an electrolytic method to make the surface of the anode current collector 1 rough. A copper foil fabricated by the electrolytic method is generally called "electrolytic copper foil".

[Anode Active Material Layer]

The anode active material layer 2 includes two anode active materials (a first anode active material 200 and a second anode active material 300 to be described later) that have ability to insert and extract an electrode reactant, and an anode binder. It is to be noted that the anode active material layer 2 may be configured of a single layer or may be configured of multiple layers.

The "electrode reactant" is a material involving charge-discharge reaction of a secondary battery. Specifically, for example, an electrode reactant used in a lithium-ion secondary battery is lithium.

Figure 2:
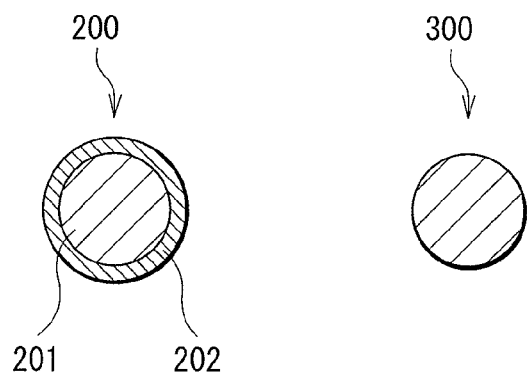
FIG. 2 is a cross-sectional view of each of configurations of a first anode active material and a second anode active material in the secondary battery-use anode according to the first embodiment of the present technology.

FIG. 2 illustrates each of cross-sectional configurations of the first anode active material 200 and the second anode active material 300. The anode active material layer 2 includes, for example, a plurality of first anode active materials 200 and a plurality of second anode active materials 300.

The second anode active material 300 includes a carbon-based material to be described later. The first anode active material 200 includes a first central portion 201 including a silicon-based material to be described later, and a first coating portion 202 provided on a surface of the first central portion 201.

The anode active material layer 2 includes the first anode active material 200 and the second anode active material 300. This makes the anode resistant to expansion and contraction during charge and discharge and makes an electrolytic solution resistant to decomposition during charge and discharge while achieving high theoretical capacity (in other words, high battery capacity).

Specifically, the carbon-based material included in the second anode active material 300 has advantages that the carbon-based material is resistant to expansion and contraction during charge and discharge and the carbon material makes the electrolytic solution resistant to decomposition during charge and discharge, whereas the carbon-based material has a concern of low theoretical capacity. In contrast, the silicon-based material included in the first central portion 201 of the first anode active material 200 has an advantage of high theoretical capacity, whereas the silicon-based material has a concern that the silicon-based material is easily expanded or contracted during charge and discharge and causes the electrolytic solution to be easily decomposed. Accordingly, using the second anode active material 300 including the carbon-based material and the first anode active material 200 including the silicon-based material in combination makes it possible to achieve high theoretical capacity and suppress expansion and contraction of the anode and decomposition of the electrolytic solution during charge and discharge.

A mixture ratio of the first anode active material 200 and the second anode active material 300 is not particularly limited, but is, for example, the first anode active material 200:the second anode active material 300=1:99 to 99:1 in weight ratio. As long as the first anode active material 200 and the second anode active material 300 are mixed, the foregoing advantage in using the first anode active material 200 and the second anode active material 300 in combination is achieved without depending on the mixture ratio.

In particular, a mixture ratio of the first anode active material 200 including the silicon-based material is preferably smaller than a mixture ratio of the second anode active material 300 including the carbon-based material. The ratio of the silicon-based material that mainly causes expansion and contraction of the anode is smaller, which makes it possible to sufficiently suppress expansion and contraction of the anode and sufficiently suppress decomposition of the electrolytic solution.

Moreover, a mixture ratio of the first anode active material 200 and the second anode active material 300 are preferably substantially constant in the anode active material layer 2. More specifically, in a case where the anode active material layer 2 is bisected in a thickness direction, the mixture ratio in a lower layer close to the anode current collector 1 and the mixture ratio in an upper layer far from the anode current collector 1 are preferably equal to each other, which makes it possible to achieve the forgoing advantage in the entirety of the anode active material layer 2. It is to be noted that in order to examine whether the mixture ratio in the lower layer and the mixture ratio in the upper layer are equal to each other, for example, a scanning electron microscope (SEM) may be used. Specifically, first, a cross section of each of the lower layer and the upper layer is observed. Thereafter, existence states (distributions) of the first anode active material 200 and the second anode active material 300 in the lower layer are compared with existence states (distributions) of the first anode active material 200 and the second anode active material 300 in the upper layer.

The anode active material layer 2 is formed, for example, by one or more of methods such as a coating method. The coating method is, for example, a method in which a dispersion liquid (slurry) including, for example, a particulate (powder) anode active material, an anode binder, and an aqueous solvent or a nonaqueous solvent (such as an organic solvent) is prepared, and thereafter the anode current collector 1 is coated with the dispersion liquid.

It is to be noted that in order to prevent the electrode reactant from being unintentionally precipitated on the anode in the middle of charge, chargeable capacity of the anode active material is preferably larger than discharge capacity of a cathode. In other words, electrochemical equivalent of the anode active material that has ability to insert and extract the electrode reactant is preferably larger than electrochemical equivalent of the cathode.

[Second Anode Active Material]

The second anode active material 300 includes one or more of the carbon-based materials. The "carbon-based material" is a material including carbon as a constituent element.

The second anode active material 300 includes the carbon-based material, which is resistant to expansion and contraction during insertion and extraction of the electrode reactant. This makes a crystal structure of the carbon-based material resistant to change, thereby stably achieving high energy density. In addition, the carbon-based material also serves as an anode conductor to be described later, thereby improving conductivity of the anode active material layer 2.

The kind of the carbon-based material is not particularly limited, but examples of the carbon-based material include graphitizable carbon, non-graphitizable carbon, and graphite. Note that a spacing of (002) plane in the non-graphitizable carbon is preferably 0.37 nm or larger, and a spacing of (002) plane in the graphite is preferably 0.34 nm or smaller.

More specifically, examples of the carbon-based material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a fired (carbonized) polymer compound, and the polymer compound is one or more of resins such as phenol resin and furan resin. Other than the materials mentioned above, the carbon-based material may be low crystalline carbon that is subjected to heat treatment at a temperature of about 1000° C. or lower, or may be amorphous carbon.

A shape of the second anode active material 300 is not particularly limited, but examples of the shape include a fibrous shape, a spherical (particle) shape, and a scale-like shape. FIG. 2 illustrates, for example, a case where the shape of the second anode active material 300 is a spherical shape. It goes without saying that the second anode active materials 300 having two or more of shapes may be mixed.

In a case where the shape of the second anode active material 300 is a particle shape, an average particle diameter of the second anode active material 300 is not particularly limited, but is, for example, in a range from about 5 μm to about 40 μm both inclusive. The average particle diameter described here is a median diameter D50 (μm), and this also applies to the following description.

[First Anode Active Material]

The first anode active material 200 includes the first central portion 201 and the first coating portion 202, as described above.

The first central portion 201 includes one or more of silicon-based materials. The "silicon-based material" is a material including silicon as a constituent element.

The first central portion 201 includes the silicon-based material, which has superior ability to insert and extract the electrode reactant, thereby achieving high energy density.

The silicon-based material may be a simple substance of silicon, an alloy of silicon, or a compound of silicon. Moreover, the silicon-based material may be a material having one or more of phases of the simple substance, the alloy, and the compound mentioned above at least in part. It is to be noted that the silicon-based material may be crystalline or amorphous.

Note that the simple substance described here merely refers to a simple substance in a general sense. In other words, the purity of the simple substance is not necessarily 100%, and the simple substance may include a small amount of impurity.

The alloy of silicon may include two or more of metal elements as constituent elements, or may include one or more of metal elements and one or more of metalloid elements as constituent elements. Moreover, the foregoing alloy of silicon may include one or more of nonmetallic elements. Examples of a structure of the alloy of silicon include a solid solution, a eutectic crystal (a eutectic mixture), an intermetallic compound, and a structure in which two or more thereof coexist.

The metal elements and the metalloid elements included in the alloy of silicon as constituent element are, for example, one or more of metal elements and metalloid elements that are able to form an alloy with the electrode reactant. Specific examples thereof include magnesium, boron, aluminum, gallium, indium, germanium, tin, lead, bismuth, cadmium, silver, zinc, hafnium, zirconium, yttrium, palladium, and platinum.

The alloy of silicon include, for example, one or more of elements such as tin, nickel, copper, iron, cobalt, manganese, zinc, indium, silver, titanium, germanium, bismuth, antimony, and chromium, as constituent elements other than silicon.

The compound of silicon includes, for example, one or more of elements such as carbon and oxygen, as constituent elements other than silicon. It is to be noted that the compound of silicon may include, for example, one or more of the elements described related to the alloy of silicon, as constituent elements other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $CusSi$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. It is to be noted that "v" in $SiO_v$ may be, for example, in a range of $0.2<v<1.4$.

Details of the shape of the first central portion 201 are, for example, similar to the details of the shape of the foregoing second anode active material 300. In a case where the shape of the first central portion 201 is a particle shape, the average particle diameter (median diameter D50) of the first central portion 201 is not particularly limited, but is, for example, in a range from about 1 μm to about 10 μm both inclusive.

The first coating portion 202 is provided at least on a portion of the surface of the first central portion 201. In other words, a portion or the entirety of the surface of the first central portion 201 may be coated with the first coating portion 202. It goes without saying that in a case where a portion of the surface of the first central portion 201 is coated with the first coating portion 202, a plurality of first coating portions 202 may be provided on the surface of the first central portion 201, that is, the surface of the first central portion 201 may be coated with the plurality of first coating portions 202.

In particular, the first coating portion 202 is preferably provided only on a portion of the surface of the first central portion 201. In this case, the entirety of the surface of the first central portion 201 is not coated with the first coating portion 202, which causes a portion of the surface of the first central portion 201 to be exposed. A movement path (insertion-extraction path) of the electrode reactant is secured in the exposed portion of the first central portion 201, which allows the electrode reactant to be smoothly inserted and extracted in the first central portion 201. Accordingly, even if charge and discharge are repeated, the secondary battery is less prone to swell, and discharge capacity is less prone to decrease. It is to be noted that the number of exposed portions may be one or more.

The first coating portion 202 includes one or both of a polyacrylate salt and a carboxymethylcellulose salt. A coating film including the polyacrylate salt and a coating film including the carboxymethylcellulose salt each have a function similar to that of a so-called SEI (Solid Electrolyte Interphase) film. Accordingly, even if the first coating portion 202 is provided on the surface of the first central portion 201, the first coating portion 202 suppresses decomposition of the electrolytic solution resulting from reactivity of the first central portion 201 without impairing insertion and extraction of the electrode reactant in the first central portion 201 by the first coating portion 202. In this case, in particular, the coating film including the polyacrylate salt and the coating film of the carboxymethylcellulose salt are resistant to decomposition even in a discharge ending stage, which sufficiently suppresses decomposition of the electrolytic solution even in the discharge ending stage.

The kind of the polyacrylate salt is not particularly limited. The polyacrylate salt may include only one polyacrylate salt or two or more polyacrylate salts.

Specifically, the polyacrylate salt includes, for example, a metal salt and an onium salt. Note that the polyacrylate salt described here is not limited to a compound in which all carboxyl groups (—COOH) included in an polyacrylic acid form a salt, and may be a compound in which some of carboxyl groups included in a polyacrylic acid form a salt. In other words, the latter polyacrylate salt may include one or more carboxyl groups.

The kind of metal ion included in the metal salt is not particularly limited, but examples of the metal ion include an alkali metal ion. Examples of the alkali metal ion include a lithium ion, a sodium ion, and a potassium ion. Specific examples of the polyacrylate salt include lithium polyacrylate, sodium polyacrylate, and potassium polyacrylate.

The kind of onium ion included in the onium salt is not particularly limited, but examples of the onium ion include an ammonium ion and a phosphonium ion. Specific examples of the polyacrylate salt include ammonium polyacrylate and phosphonium polyacrylate.

It is to be noted that the polyacrylate salt may include only the metal ion, only the onium ion, or both the metal ion and the onium ion in one molecule. Even in this case, the polyacrylate salt may include one or more carboxyl groups, as described above.

The kind of the carboxymethylcellulose salt is not particularly limited. The carboxymethylcellulose salt may include only one carboxymethylcellulose salt, or two or more carboxymethylcellulose salts.

Specific examples of the carboxymethylcellulose salt include a metal salt. Note that the carboxymethylcellulose salt described here is not limited to a compound in which all hydroxyl groups (—OH) included in carboxymethylcellulose form a salt, and may be a compound in which some of hydroxyl groups included in carboxymethylcellulose form a salt. In other words, the latter carboxymethylcellulose salt may include one or more hydroxyl groups.

The kind of metal ion included in the metal salt is not particularly limited, but examples of the metal ion include an alkali metal ion. Examples of the alkali metal ion include a lithium ion, a sodium ion, and a potassium ion. Specific examples of the carboxymethylcellulose salt include carboxymethylcellulose lithium, carboxymethylcellulose sodium, and carboxymethylcellulose potassium.

A thickness of the first coating portion 202 is not particularly limited, but is, for example, preferably less than about 1 µm, which makes insertion and extraction of the electrode reactant in the first central portion 201 more resistant to impairment.

The "thickness of the first coating portion 202" is a so-called average thickness T2, and is calculated by the following procedure, for example. First, a cross section of the first anode active material 200 is observed with use of a microscope such as a field-emission scanning electron microscope (FE-SEM). In this case, magnification is adjusted so as to observe about ⅓ of an entire image of the first anode active material 200. More specifically, in a case where the average particle diameter (median diameter D50) of the first anode active material 200 is about 20 µm, the magnification is adjusted to about 2000 times. Subsequently, the thickness of the first coating portion 202 is measured at five points located at equal intervals on the basis of an observation result (a micrograph). The interval is, for example, about 0.5 µm. Lastly, an average value (the average thickness T2) of the thicknesses measured at five points is calculated.

A coverage of the first coating portion 202, that is, a ratio of a surface coated with the first coating portion 202 of the first central portion 201 is not particularly limited, but is, for example, preferably about 50% or more. In particular, the coverage of the first coating portion 202 is preferably in a range from about 50% to about 100% both inclusive, and more preferably in a range from about 50% to less than 100%, which makes the electrolytic solution resistant to decomposition while allowing the first central portion 201 to smoothly insert and extract the electrode reactant.

The "coverage of the first coating portion 202" is a so-called average coverage, and is calculated by the following procedure, for example. First, a cross-section of the first anode active material 200 is observed with use of a microscope such as a field-emission scanning electron microscope (FE-SEM). In this case, magnification is adjusted so as to observe about ⅓ of an entire image of the first anode active material 200, and a cross section of the first coating portion 202 is observed at ten random points (ten views). Details of the magnification are similar to those in a case where the average thickness of the first coating portion 202 is calculated. Subsequently, a coverage per view is calculated on the basis of an observation result (a micrograph). In this case, a length L1 of an outer rim (contour) of an entire image of the first central portion 201 is measured, and a length L2 of an outer rim of a portion coated with the first coating portion 202 of the first central portion 201 is measured, and thereafter, the coverage=(L2/L1)×100 is calculated. Lastly, an average value of the coverages calculated at ten views is calculated.

It is to be noted that a specific surface area of the first anode active material 200 is not particularly limited; however, in particular, the specific surface area of the first anode active material 200 is preferably in a range from about 0.1 $m^2/g$ to about 10 $m^2/g$ both inclusive, and more preferably in a range from about 0.5 $m^2/g$ to about 1 $m^2/g$ both inclusive. An excessively large specific surface area causes a possibility that discharge capacity loss is increased by occurrence of side reaction. Moreover, an excessively small specific surface area causes a possibility that electrical resistance under a high load is increased by lack of a reaction area. The specific surface area described here is a BET specific surface area.

Moreover, a ratio W1 of a weight of the first coating portion 202 to a weight of the first central portion 201 is not particularly limited, but is, for example, preferably less than 20 wt %. An excessively large ratio W1 causes a coating amount by the first coating portion 202 to become excessively large, thereby causing a possibility that electrical resistance under a high load is increased. The ratio W1 is calculated by W1 (wt %)=(the weight of the first coating portion 202/the weight of the first central portion 201)×100.

Further, in a case where each of the first anode active material 200 and the second anode active material 300 is in a form of a plurality of particles, a ratio D1/D2 of a median diameter D1 (D50: μm) of the first anode active material 200 to a median diameter D2 (D50: μm) of the second anode active material 300 is not particularly limited; however, in particular, the ratio D1/D2 is preferably in a range from about 0.05 to about 2 both inclusive. An excessively small ratio D1/D2 causes a possibility that while discharge capacity loss is increased by occurrence of side reaction, discharge capacity is decreased by lack of an electron path. Moreover, an excessively large ratio D1/D2 causes a possibility that the anode expands.

In this case, a distribution of a plurality of pores included in the anode active material layer 2 is preferably made appropriate. Specifically, the anode active material layer 2 including the first anode active material 200, the second anode active material 300, and the anode binder has a plurality of pores. A pore diameter at which a change rate of a mercury intrusion amount into the plurality of pores exhibits a peak in measurement of the change rate of the mercury intrusion amount with use of a mercury intrusion technique is not particularly limited; however, in particular, the pore diameter is preferably in a range from about 0.5 μm to about 5 μm both inclusive. An excessively small pore diameter causes a possibility that discharge capacity is decreased by lack of permeation of an electrolytic solution into the anode active material layer 2. Moreover, an excessively large pore diameter causes a possibility that while the discharge capacity is decreased by lack of contact between the first anode active materials 200 and lack of contact between the second anode active materials 300, energy density is decreased by lack of filling of the first anode active material 200 and the second anode active material 300.

In order to examine the change rate of the mercury intrusion amount into the plurality of pores, a distribution of the change rate of the mercury intrusion amount (where a horizontal axis indicates a pore diameter (nm) and a vertical axis indicates the change rate of the mercury intrusion amount) is measured with use of a mercury intrusion technique. A mercury porosimeter is used to measure the distribution of the change rate of the mercury intrusion amount. Through measurement using the mercury porosimeter, a mercury intrusion amount V into the plurality of pores is measured while increasing a pressure P in a stepwise manner, which results in plotting of the change rate of the mercury intrusion amount ($\Delta V/\Delta P$) with respect to the pore diameter. Note that the mercury intrusion amount is a value measured in a case where surface tension of mercury is 485 mN/m, a contact angle of mercury is 130°, and a relationship between a pore diameter of a pore and pressure is approximate to 180/pressure=the pore diameter. In order to specify a pore diameter at which the change rate of the mercury intrusion amount exhibits a peak, the foregoing distribution of the change rate of the mercury intrusion amount may be measured, and thereafter, a position (pore diameter) at which the change rate of the mercury intrusion amount exhibits the peak may be examined.

[Anode Binder]

The anode binder includes one or more of materials such as styrene butadiene rubber, polyimide, and aramid, which improves binding properties of, for example, the first anode active material 200 and the second anode active material 300.

The anode is manufactured with use of a nonaqueous dispersion liquid including the first anode active material 200, the second anode active material 300, and the anode binder, as described later. In the nonaqueous dispersion liquid, the first anode active material 200 and the second anode active material 300 are dispersed, and the anode binder is dissolved.

[Hydrogen Binding Buffer]

The anode active material layer 2 may further include one or more of hydrogen binding buffers that cause rebinding of hydrogen bonds.

In a case where the anode active material layer 2 includes the hydrogen binding buffer, even if a binding structure including the first anode active material 200 and the second anode active material 300 is broken, the hydrogen binding buffer restores the broken binding structure. Accordingly, even if charge and discharge are repeated, the secondary battery is less prone to swell, the electrolytic solution is less prone to be decomposed, and discharge capacity is less prone to decrease.

Specifically, the first anode active material 200 and the second anode active material 300 are bound through the anode binder, which causes hydrogen bonds between the first anode active material 200 and the anode binder and causes hydrogen bonds between the second anode active material 300 and the anode binder. Accordingly, a binding structure including the first anode active material 200, the second anode active material 300, and the anode binder is formed in the anode active material layer 2. In this case, in a case where the binding structure is broken by expansion and contraction of the anode and self-decomposition of the binding structure, hydrogen bonds break in the binding structure, thereby decreasing the binding properties and coatability of the first anode active material 200 and the second anode active material 300. However, in the case where the anode active material layer 2 includes the hydrogen binding buffer, the hydrogen binding buffer maintains pH in the anode active material layer 2 in a neutral-to-slightly alkaline range at a position where the hydrogen bonds break, resulting in rebinding of the broken hydrogen bonds. Thus, the binding structure is self-restored, and thereby maintained.

The kind of the hydrogen binding buffer is not particularly limited, as long as the hydrogen binding buffer is one or more of materials that have ability to rebind the hydrogen bonds. Specifically, the hydrogen binding buffer is, for example, a material that is allowed to prepare a buffer solution having a pH ranging from about 6.8 to about 9.6, and more specific examples thereof include a borate salt, a phosphate salt, ethanolamine, ammonium hydrogen carbonate, and ammonium carbonate.

Examples of the borate salt includes a borate salt of an alkali metal element and a borate salt of an alkaline-earth metal element, and specific examples thereof include sodium borate and potassium borate. Examples of the phosphate salt include a phosphate salt of an alkaline metal element and a phosphate salt of an alkaline-earth metal element, and specific examples thereof include sodium phosphate and potassium phosphate. Examples of the ethanolamine include monoethanolamine. It is to be noted that as an example of a method of preparing the buffer solution, in order to prepare 100 mmol/L of a sodium borate aqueous solution (having a pH=9.1), 100 mmol of a boric acid, 50 mmol of sodium hydroxide, and water are mixed to allow an amount of an entire aqueous solution to reach 1 L.

[Silane Coupling Agent]

Moreover, the anode active material layer 2 may further include one or more of silane coupling agents having high affinity for the anode binder.

In a case where the anode active material layer 2 includes the silane coupling agent, the first anode active material 200, the second anode active material 300, etc. are easily bound through the silane coupling agent. Accordingly, even if charge and discharge are repeated, the secondary battery is less prone to swell, and discharge capacity is less prone to decrease. It is to be noted that constituent components, that are easily bound with use of the anode binder, of the anode include, for example, the anode current collector 1 and an anode conductor in addition to the foregoing first anode active material 200 and the foregoing second anode active material 300.

The kind of the silane coupling agent is not particularly limited, as long as the silane coupling agent includes one or more of materials having high affinity for each of polyvinylidene fluoride, polyimide, and aramid. Specific examples of the silane coupling agent include one or more of a silane coupling agent including an amino group, a silane coupling agent including sulfur as a constituent element, and a silane coupling agent including fluorine as a constituent element. Examples of the silane coupling agent including the amino group include 3-aminopropylmethyldiethoxysilane, 3-aminopropyltriethoxysilane, and N,N'-bis[3-trimethoxysilyl]propylethylenediamine. Examples of the silane coupling agent including sulfur as a constituent element include bis[3-(triethoxysilyl)propyl]tetrasulfide, bis[3-(triethoxysilyl)propyl]disulfide, 3-mercaptopropyltrimethoxysilane, and 3-mercaptopropylmethyldimethoxysilane. Examples of the silane coupling agent including fluorine as a constituent element include (heptadecafluoro-1,1,2,2-tetrahydrodecyl)-trimethoxysilane, (heptadecafluoro-1,1,2,2-tetrahydrodecyl)-tris(dimethylamino)silane, and (heptadecafluoro-1,1,2,2-tetrahydrodecyl)-triethoxysilane.

[Other Materials]

It is to be noted that the anode active material layer 2 may further include one or more of other materials.

Examples of the other materials include other anode active materials that have ability to insert and extract the electrode reactant. The other anode active materials each include one or more of metal-based materials. The "metal-based material" is a material including one or more of metal elements and metalloid elements as constituent elements, which achieves high energy density.

The metal-based material may be any of a simple substance, an alloy, and a compound, or may be a material having one or more of phases of the simple substance, the alloy, and the compound mentioned above at least in part. It is to be noted that the meaning of the "simple substance" is as described above.

The alloy may include two or more of metal elements as constituent element, or may include one or more of metal elements and one or more of metalloid elements as constituent elements. Moreover, the foregoing alloy may further include one or more of nonmetallic elements. Examples of a structure of the alloy include a solid solution, a eutectic crystal (a eutectic mixture), an intermetallic compound, and a structure in which two or more thereof coexist.

The metal elements and the metalloid elements included in the metal-based materials as constituent elements are, for example, one or more of metal elements and metalloid elements that are able to form an alloy with the electrode reactant. Specific examples thereof include magnesium, boron, aluminum, gallium, indium, silicon, germanium, tin, lead, bismuth, cadmium, silver, zinc, hafnium, zirconium, yttrium, palladium, and platinum.

In particular, one or both of silicon and tin are preferable. Silicon and tin have superior ability to insert and extract the electrode reactant, and achieve high energy density accordingly.

Details of the alloy of silicon and the compound of silicon are, for example, as described above.

An alloy of tin includes, for example, one or more of elements such as silicon, nickel, copper, iron, cobalt, manganese, zinc, indium, silver, titanium, germanium, bismuth, antimony, and chromium, as constituent elements other than tin. A compound of tin includes, for example, one or more of elements such as carbon and oxygen, as constituent elements other than tin. It is to be noted that the compound of tin may include, for example, one or more of the elements described related to the alloy of tin, as constituent elements other than tin.

Examples of the alloy of tin and the compound of tin include $SnO_w$ ($0<w\leq2$), $SnSiO_3$, $LiSnO$, and $Mg_2Sn$.

The material that includes tin as a constituent element may be, for example, a material (a tin-containing material) that includes, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium, hafnium, tantalum, tungsten, bismuth, and silicon. The third constituent element includes, for example, one or more of elements such as boron, carbon, aluminum, and phosphorus. This makes it possible to achieve, for example, high battery capacity and superior cycle characteristics.

In particular, the tin-containing material is preferably a material (a tin-cobalt-carbon-containing material) that includes tin, cobalt, and carbon as constituent elements. A composition of the tin-cobalt-carbon-containing material is, for example, as follows. A content of carbon is from 9.9 mass % to 29.7 mass % both inclusive, and a ratio of contents of tin and cobalt (Co/(Sn+Co)) is from 20 mass % to 70 mass % both inclusive. This makes it possible to achieve high energy density.

The tin-cobalt-carbon-containing material has a phase that includes tin, cobalt, and carbon, and such a phase is preferably low crystalline or amorphous. This phase is a phase (a reaction phase) that is able to react with the electrode reactant, and existence of the reaction phase results in achievement of superior characteristics in the tin-cobalt-carbon-containing material. A half width (a diffraction angle 2θ) of a diffraction peak obtained by X-ray diffraction of this reaction phase is preferably 1° or larger in a case where a CuKα ray is used as a specific X-ray, and an insertion rate is 1°/min. This makes it possible to insert and extract the electrode reactant more smoothly, and to decrease reactivity with the electrolytic solution. It is to be noted that, in some cases, the tin-cobalt-carbon-containing material may include any other layer in addition to the low-crystalline phase or the amorphous phase. The other layer is, for example, a phase including simple substances of the respective constituent elements or a phase including some of the respective constituent elements.

Comparison between X-ray diffraction charts before and after an electrochemical reaction with the electrode reactant makes it possible to easily determine whether the diffraction peak obtained by the X-ray diffraction corresponds to the reaction phase that is able to react with the electrode reactant. For example, if a position of the diffraction peak after the electrochemical reaction with the electrode reactant is changed from the position of the diffraction peak before the electrochemical reaction with the electrode reactant, it is possible to determine that the obtained diffraction peak corresponds to the reaction phase that is able to react with the electrode reactant. In this case, for example, the diffraction peak of the low-crystalline reaction phase or the amorphous reaction phase is seen in a range of 2θ that is from 20° to 50° both inclusive. Such a reaction phase includes, for example, the respective constituent elements mentioned above, and it is considered that such a reaction phase has become low crystalline or amorphous mainly because of existence of carbon.

In the tin-cobalt-carbon-containing material, part or all of carbon that is the constituent element thereof is preferably bound to one of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al—Kα ray or a Mg—Kα ray is used as a soft X-ray. In a case where part or all of carbon is bound to one of the metal element and the metalloid element, etc., a peak of a synthetic wave of 1s orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded as energy standard (284.8 eV). In XPS measurement, a waveform of the peak of C1s is obtained as a form that includes the peak of the surface contamination carbon and the peak of the carbon in the tin-cobalt-carbon-containing material. The two peaks are therefore separated from each other, for example, by analysis with use of commercially-available software. In the analysis of the waveform, a position of the main peak that exists on the lowest bound energy side is regarded as the energy standard (284.8 eV).

The tin-cobalt-carbon-containing material may further include, for example, one or more of elements such as silicon, iron, nickel, chromium, indium, niobium, germanium, titanium, molybdenum, aluminum, phosphorus, gallium, and bismuth, as constituent elements.

Other than the tin-cobalt-carbon-containing material, a material (a tin-cobalt-iron-carbon-containing material) that includes tin, cobalt, iron, and carbon as constituent elements is also preferable. Any composition of the tin-cobalt-iron-carbon-containing material is adopted.

For example, a composition in a case where a content of iron is set smaller is as follows. A content of carbon is from 9.9 mass % to 29.7 mass % both inclusive, a content of iron is from 0.3 mass % to 5.9 mass % both inclusive, and a ratio of contents of tin and cobalt (Co/(Sn+Co)) is from 30 mass % to 70 mass % both inclusive. Such composition ranges allow for achievement of high energy density.

For example, a composition in a case where the content of iron is set larger is as follows. The content of carbon is from 11.9 mass % to 29.7 mass % both inclusive, the ratio of contents of tin, cobalt, and iron ((Co+Fe)/(Sn+Co+Fe)) is from 26.4 mass % to 48.5 mass % both inclusive, and the ratio of contents of cobalt and iron (Co/(Co+Fe)) is from 9.9 mass % to 79.5 mass % both inclusive. Such composition ranges allow for achievement of high energy density.

It is to be noted that physical characteristics (conditions such as a half width) of the tin-cobalt-iron-carbon-containing material are similar to physical characteristics of the foregoing tin-cobalt-carbon-containing material.

Moreover, examples of other anode active materials include a metal oxide and a polymer compound. Examples of the metal oxide include iron oxide, ruthenium oxide, and molybdenum oxide. Examples of the polymer compound include polyacetylene, polyaniline, and polypyrrole.

Further, examples of the other materials include other anode binders. Examples of the other anode binders include a synthetic rubber and a polymer material. Examples of the synthetic rubber include a fluorine-based rubber and ethylene propylene diene. Examples of the polymer materials include polyimide and a polyacrylate salt. Details of the kind etc. of the polyacrylate salt used as the anode binder are, for example, similar to the details of the kind etc. of the polyacrylate salt included in the first coating portion 202 mentioned above.

In addition, examples of the other material include an anode conductor. The anode conductor includes, for example, one or more of conductors such as a carbon material. Examples of the carbon material include graphite, carbon black, acetylene black, and Ketjen black. Moreover, the carbon material may be, for example, fibrous carbon including carbon nanotubes. Note that the anode conductor may be any material having conductivity such as a metal material and a conductive polymer compound.

(1-2. Method of Manufacturing Secondary Battery-Use Anode)

The anode is manufactured by the following procedure. Since formation materials of the constituent components configuring the anode have been already described in detail, hereinafter, description of the formation materials is omitted as appropriate.

First, the first central portion 201 including the silicon-based material, one or both of the polyacrylate salt and the carboxymethylcellulose salt, an aqueous solvent, and other materials are mixed. Thereafter, a resultant mixture may be stirred. A stirring method and stirring conditions are not particularly limited; however, for example, a stirring apparatus such as a stirrer may be used.

Accordingly, the first central portion 201 is dispersed in the aqueous solvent, one or both of the polyacrylate salt and the carboxymethylcellulose salt are dissolved in the aqueous solvent, thereby preparing an aqueous dispersion liquid including the first central portion 201 and one or both of the polyacrylate salt and the carboxymethylcellulose salt.

The kind of the aqueous solvent is not particularly limited, but is, for example, pure water. As the polyacrylate salt, an insoluble matter or a soluble matter may be used. The soluble matter is, for example, a solution in which the polyacrylate salt is dissolved in pure water etc., and is a so-called polyacrylate salt aqueous solution. As the carboxymethylcellulose salt, an insoluble matter or a soluble matter may be used. The soluble matter is, for example, a solution in which the carboxymethylcellulose salt is dissolved in pure water, etc., and is a so-called carboxymethylcellulose salt aqueous solution.

It is to be noted that in a case where the hydrogen binding buffer is used, for example, a hydrogen binding buffer is preferably included in the foregoing aqueous dispersion liquid. As described above, even if hydrogen bonds break, the hydrogen bonds are restored by the hydrogen binding buffer.

Subsequently, the first anode active material 200 is separated from the aqueous dispersion liquid.

A separation method is not particularly limited, but is, for example, a filtering method. In a case where the filtering method is used, the aqueous dispersion liquid is filtered to collect a residue. Thereafter, the residue may be dried. Filtering conditions and drying conditions are not particularly limited.

In the aqueous dispersion liquid, the first coating portion 202 including one or both of the polyacrylate salt and the carboxymethylcellulose salt is formed on the surface of the first central portion 201 to form the first anode active material 200. Accordingly, the aqueous dispersion liquid is filtered to obtain the first anode active material 200 as a residue.

Next, the first anode active material 200, the second anode active material 300 including the carbon-based material, the anode binder including one or more of polyvinylidene fluoride, polyimide, and aramid, a nonaqueous solvent, etc. are mixed. Thereafter, a resultant mixture may be stirred. A stirring method and stirring conditions are not particularly limited; however, for example, a stirring apparatus such as a mixer may be used.

The kind of the nonaqueous solvent is not particularly limited, as long as the nonaqueous solvent is one or more of materials that have ability to disperse the first anode active material 200 and the second anode active material 300 and have ability to dissolve each of polyvinylidene fluoride, polyimide, and aramid. Examples of the nonaqueous solvent include organic solvents such as N-methyl-2-pyrrolidone.

Accordingly, the anode binder is dissolved in the nonaqueous solvent to thereby prepare the nonaqueous dispersion liquid including the first anode active material 200, the second anode active material 300, and the anode binder. The state of the nonaqueous dispersion liquid is not particularly limited, but is, for example, a paste state. The paste nonaqueous dispersion liquid is so-called slurry.

Lastly, the anode is manufactured with use of the nonaqueous dispersion liquid. In this case, for example, both surfaces of the anode current collector 1 are coated with the nonaqueous dispersion liquid, and thereafter, the nonaqueous dispersion liquid is dried. Accordingly, the anode active material layers 2 including the first anode active material 200, the second anode active material 300, and the anode binder are formed to thereby complete the anode.

Thereafter, the anode active material layer 2 may be compression-molded with use of, for example, a roll pressing machine. In this case, the cathode active material layer 2 may be heated, and may be compression-molded a plurality of times. Compression conditions and heating conditions are not particularly limited.

It is to be noted that in the foregoing method of manufacturing the anode, the filtering method is used to form the first anode active material 200; however, any other method may be used. In this case, two or more of methods may be used in combination.

Specifically, a spray drying method may be used. In a case where the spray drying method is used, for example, in place of filtering the aqueous dispersion liquid, the aqueous dispersion liquid is sprayed with use of a spray drying apparatus, and thereafter, the sprayed matter is dried. The first coating portion 202 is formed on the surface of the first central portion 201 to thereby obtain the first anode active material 200.

Alternatively, for example, a pulverizing method may be used. In a case where the pulverizing method is used, in place of filtering the aqueous dispersion liquid, for example, after drying the aqueous dispersion liquid, a dried matter is pulverized with use of a pulverizer. Accordingly, the first coating portion 202 is formed on the surface of the first central portion 201 to thereby obtain the first anode active material 200. The kind of the pulverizer is not particularly limited, but is, for example, a planetary ball mill.

(1-3. Action and Effects)

According to the anode, the first anode active material 200, the second anode active material 300, and the anode binder are included. The second anode active material 300 includes the carbon-based material. In the first anode active material 200, the first coating portion 202 including one or both of the polyacrylate salt and the carboxymethylcellulose salt is provided on the surface of the first central portion 201 including the silicon-based material. The anode binder includes one or more of polyvinylidene fluoride, polyimide, and aramid.

In this case, while the binding properties of the first anode active material 200, the second anode active material 300, etc. are secured, the first central portion 201 smoothly inserts and extracts the electrode reactant, and decomposition of the electrolytic solution resulting from reactivity of the first central portion 201 is suppressed, as described above. Accordingly, even if charge and discharge are repeated, the secondary battery is less prone to swell, and discharge capacity is less prone to decrease, which makes it possible to improve battery characteristics of the secondary battery using the anode.

In particular, the thickness of the first coating portion 202 is less than 1 μm, or the coverage of the first coating portion 202 is 50% or more, which makes it possible to achieve a higher effect.

In a case where the anode includes the hydrogen binding buffer, the binding structure including the first anode active material 200, the second anode active material 300, and the anode binder is restored by the hydrogen binding buffer, which makes it possible to achieve a higher effect.

In a case where the anode includes the silane coupling agent, the first anode active material 200, the second anode active material 300, and any other material are easily bound through the silane coupling agent, which makes it possible to achieve a higher effect.

Moreover, according to the method of manufacturing the anode, the anode is manufactured by the following procedure. The aqueous dispersion liquid that includes the first central portion 201 including the silicon-based material, one or both of the polyacrylate salt and the carboxymethylcellulose salt, and the aqueous solvent is prepared. The first anode active material 200 in which the first coating portion including one or both of the polyacrylate salt and the carboxymethylcellulose salt is provided on the surface of the first central portion 201 is separated from the aqueous dispersion liquid. The nonaqueous dispersion liquid including the first anode active material 200, the second anode active material 300 including the carbon-based material, the anode binder including one or more of polyvinylidene fluoride, polyimide, and aramid, and the nonaqueous solvent is prepared. The anode is manufactured with use of the nonaqueous dispersion liquid.

In this case, the anode having the foregoing advantages is manufactured. This makes it possible to improve battery characteristics of the secondary battery using the anode.

2. Secondary Battery-use Anode and Method of Manufacturing Same (Second Embodiment Next, description is given of a secondary battery-use anode and a method of manufacturing the same according to a second embodiment of the present technology.

(2-1. Secondary Battery-Use Anode)

The secondary battery-use anode described here (hereinafter simply referred to as "anode") has a configuration similar to that of the anode according to the first embodiment, except that the anode includes a second anode active material 400 to be described later in place of the second anode active material 300. In the following description, the configuration of the anode according to the present embodiment is described while components of the anode according to the first embodiment are used where appropriate.

Figure 3:
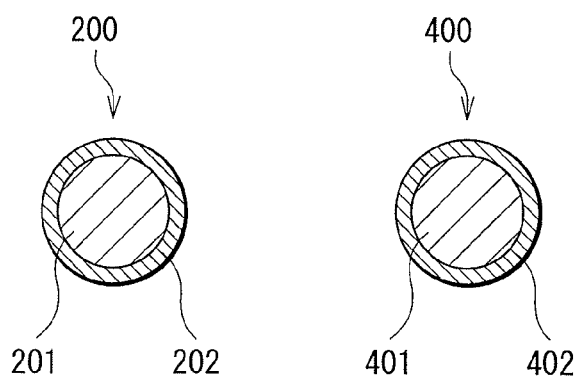
FIG. 3 is a cross-sectional view of each of configurations of a first anode active material and a second active material in a secondary battery-use anode according to a second embodiment of the present technology.

FIG. 3 illustrates each of cross-sectional configurations of the first anode active material 200 and the second anode active material 400.

The second anode active material 400 has, for example, a configuration substantially similar to that of the first anode active material 200. More specifically, the second anode active material 400 includes, for example, a second central portion 401 including a carbon-based material and a second coating portion 402 provided on a surface of the second central portion 401.

The second central portion 401 has, for example, a configuration substantially similar to that of the second anode active material 300. Specifically, details of the formation materials and shape of the second central portion 401 are, for example, substantially similar to details of the formation materials and shape of the second anode active material 300. In other words, the first central portion 401 includes a carbon-based material. In a case where the shape of the second central portion 401 is a particle shape, an average particle diameter (median diameter D50) of the second central portion 401 is not particularly limited, but is, for example, in a range from about 5 μm to about 40 μm both inclusive.

The second coating portion 402 has, for example, a configuration substantially similar to that of the first coating portion 202. Specifically, details of the coating range, formation materials, thickness, coverage, etc. of the second coating portion 402 are, for example, substantially similar to details of the coating range, formation materials, thickness, coverage, etc. of the first coating portion 202. In other words, the second coating portion 402 includes one or both of the polyacrylate salt and the carboxymethylcellulose salt. Details of each of the polyacrylate salt and the carboxymethylcellulose salt are as described above, for example. Note that, for example, the configuration of the second coating portion 402 may be the same as or different from the configuration of the first coating portion 202.

Details of a mixture ratio of the first anode active material 200 and the second anode active material 400 are, for example, similar to details of the mixture ratio of the first anode active material 200 and the second anode active material 300.

The second anode active material 400 includes the second central portion 401 and the second coating portion 402, which makes it possible to achieve advantages similar to those in the case where the first anode active material 200 includes the first central portion 201 and the first coating portion 202. In other words, even if the second coating portion 402 is provided on the surface of the second central portion 401, the second coating portion 402 suppresses decomposition of the electrolytic solution resulting from reactivity of the second central portion 401 without impairing insertion and extraction of the electrode reactant in the second central portion 401 by the second coating portion 402.

It is to be noted that the thickness of the first coating portion 202 and the thickness of the second coating portion 402 may be equal to or different from each other. In particular, the thickness of the first coating portion 202 and the thickness of the second coating portion 402 are preferably different from each other.

Specifically, for example, the thickness of the second coating portion 402 may be smaller than the thickness of the first coating portion 202. This improves ionic conductivity on the surface (interface) of the second central portion 401 including the carbon-based material and suppresses decomposition of the electrolytic solution on the surface (interface) of the first central portion 201 including the silicon-based material.

Alternatively, for example, the thickness of the first coating portion 202 may be smaller than the thickness of the second coating portion 402, which reduces charge-discharge loss of the electrode reactant and suppresses decomposition of the electrolytic solution in a case where the second central portion 401 includes a carbon-based material having low charge-discharge efficiency (such as natural graphite).

In a case where the first anode active material 200 includes the first coating portion 202 and the second anode active material 400 includes the second coating portion 402, a ratio W2 (wt %) of one or both of the polyacrylate salt and the carboxymethylcellulose salt included in the anode active material layer 2 is not particularly limited.

The "ratio W2 of one or both of the polyacrylate salt and the carboxymethylcellulose salt" is a ratio of a total weight WB of one or both of the polyacrylate salt and the carboxymethylcellulose salt included in the anode active material layer 2 to a weight WA of all components included in the anode active material layer 2. The total weight WB is a sum of an average weight WB1 of one or both of the polyacrylate salt and the carboxymethylcellulose salt included in the first coating portion 202 and an average weight WB2 of one or both of the polyacrylate salt and the carboxymethylcellulose salt included in the second coating portion 402. The foregoing ratio W2 is calculated by [(WB1+WB2)/WA]×100.

The ratio W2 is an indication of a total amount (a total coating amount) of one or both of the polyacrylate salt and the carboxymethylcellulose salt included in both the first coating portion 202 and the second coating portion 402. In other words, in a case where the ratio W2 is small, the coating amount (such as a coating range and a thickness) of the first coating portion 202 tends to be small, and the coating amount (such as a coating range and a thickness) of the second coating portion 402 tends to be small. In contrast, in a case where the ratio W2 is large, the coating amount of the first coating portion 202 tends to be large, and the coating amount of the second coating portion 402 tends to be large.

In particular, the ratio W2 is preferably not too large. Specifically, the ratio W2 is preferably in a range from about 0.1 wt % to about 4.5 wt % both inclusive, and more preferably in a range from about 0.1 wt % to about 2 wt % both inclusive. The amount of one or both of the polyacrylate salt and the carboxymethylcellulose salt included in the anode active material layer 2, that is, the coating amount of the first coating portion 202 on the first central portion 201 is appropriately controlled, which makes ionic conductivity less prone to decrease on the surface (interface) of the first central portion 201; therefore, even if the first central portion 201 is coated with the first coating portion 202, the electrode reactant is smoothly inserted in and extracted from the first central portion 201. Accordingly, even if charge and discharge are repeated, the secondary battery is less prone to swell, and discharge capacity is less prone to decrease.

Even in the second central portion 401 coated with the second coating portion 402, the electrode reactant is smoothly inserted and extracted in a similar manner; therefore, even if charge and discharge are repeated, the secondary battery is less prone to swell, and discharge capacity is less prone to decrease.

It is to be noted that the first coating portion 202 including one or both of the polyacrylate salt and the carboxymethylcellulose salt also serves as the anode binder, which causes the first central portions 201 to be bound through the first coating portion 202. In this case, in a case where the ratio W2 is controlled to satisfy an appropriate condition (=0.1 wt % to 4.5 wt %), the amount of one or both of the polyacrylate salt and the carboxymethylcellulose salt serving as the anode binder decreases; therefore, it seems that the binding property between the first anode active materials 200 is insufficient.

However, the anode active material layer 2 includes one or more of polyvinylidene fluoride, polyimide, and aramid in addition to one or both of the polyacrylate salt and the carboxymethylcellulose salt mentioned above. Accordingly, the first anode active materials 200 are sufficiently bound through the anode binder. Thus, even if the ratio W2 is controlled, the binding property between the first anode active materials 200 is secured.

Accordingly, even if the ratio W2 is controlled, the binding property between the second anode active materials 400 is similarly secured.

The ratio W2 is calculated by the following procedure, for example.

First, the anode active material layer 2 is analyzed with use of, for example, an analysis method such as a scanning electron microscope-energy dispersive X-ray spectroscopy (SEM-EDX) to specify a coating portion (the first coating portion 202) in the first anode active material 200 and measure the thickness of the first coating portion 202. More specifically, in a case where the first coating portion 202 includes sodium polyacrylate as the polyacrylate salt, a formation range of the first coating portion 202 is specified and an average thickness of the first coating portion 202 is determined on the basis of an existence state of a sodium element in proximity to the surface of the first central portion 201. The average thickness of the first coating portion 202 is determined by the foregoing procedure.

Next, a volume of one or both of the polyacrylate salt and the carboxymethylcellulose salt included in the first coating portion 202 is calculated by multiplying an apparent surface area of the first anode active material 200 per unit area of the anode active material layer 2 by the average thickness of the first coating portion 202. Subsequently, the average weight WB1 of one or both of the polyacrylate salt and the carboxymethylcellulose salt included in the first coating portion 202 is calculated by multiplying the volume by a specific gravity of one or both of the polyacrylate salt and the carboxymethylcellulose salt. For example, in a case where the polyacrylate salt is sodium polyacrylate, the specific gravity of sodium polyacrylate is 1.22.

The apparent surface area of the first anode active material 200 is determined by the following procedure, for example. First, a cross-sectional photograph of the anode active material layer 2 is obtained with use of a scanning electron microscope, etc. Next, a particle size distribution of the first anode active material 200 (correlation between the particle diameter of the first anode active material 200 and the number of the first anode active materials 200) is measured on the basis of the cross-sectional photograph of the anode active material layer 2 with use of image analysis software. As the image analysis software, for example, particle size distribution image analysis software MAC-VIEW available from Mountech Co., Ltd is used. Lastly, the apparent surface area of the first anode active material 200 per unit area of the anode active material layer 2 is calculated on the basis of a result of measurement of the particle size distribution of the first anode active material 200.

Moreover, the average weight WB2 of one or both of the polyacrylate salt and the carboxymethylcellulose salt included in the second coating portion 402 is calculated by a procedure similar to the foregoing procedure of calculating the average weight WB1.

Lastly, the ratio W2 is calculated on the basis of the weight WA of the anode active material layer 2 per unit area and the foregoing average weights WB1 and WB2 of one or both of the polyacrylate salt and the carboxymethylcellulose salt. Thus, the weight ratio W2 is determined.

Herein, the anode active material layers 2 are provided on both surfaces of the anode current collector 1. Accordingly, in a case where the anode includes two anode active material layers 2, the foregoing condition related to the weight ratio W2 is applied to one or both of the two anode active material layers 2. In other words, the condition related to the weight ratio W2 may be applied to the anode active material layer 2 provided on one surface (a front surface) of the anode current collector 1, the anode active material layer 2 provided on the other surface (a back surface) of the anode current collector 1, or each of the two anode active material layers 2.

In particular, the condition related to the weight ratio W2 is preferably applied to each of the two anode active material layers 2, which makes it possible to achieve the foregoing advantage in each of the anode active material layers 2, thereby achieving a higher effect.

(2-2. Method of Manufacturing Secondary Battery-Use Anode)

The anode is manufactured by a procedure similar to the procedure of manufacturing the anode according to the first embodiment, except that the second anode active material 400 is formed, for example, by a procedure similar to the procedure of forming the first anode active material 200.

First, the first central portion 201 including the silicon-based material, the second central portion 401 including the carbon-based material, one or both of the polyacrylate salt and the carboxymethylcellulose salt, the aqueous solvent, etc. are mixed, and thereafter, a resultant mixture is stirred on an as-needed basis. Accordingly, the first central portion 201 and the second central portion 401 are dispersed in the aqueous solvent, and one or both of the polyacrylate salt and the carboxymethylcellulose salt are dissolved in the aqueous solvent, thereby preparing an aqueous dispersion liquid including the first central portion 201, the second central portion 401, and one or both of the polyacrylate salt and the carboxymethylcellulose salt.

Subsequently, the first anode active material 200 and the second anode active material 400 are separated from the aqueous dispersion liquid. In this case, for example, a filtering method is used. In a case where the filtering method is used, the aqueous dispersion liquid is filtered to collect a residue. Thereafter, the residue may be dried on an as-needed basis.

In the aqueous dispersion liquid, the first coating portion 202 including one or both of the polyacrylate salt and the carboxymethylcellulose salt is formed on the surface of the first central portion 201 to form the first anode active material 200. Moreover, in the aqueous dispersion liquid, the second coating portion 402 including one or both of the polyacrylate salt and the carboxymethylcellulose salt is formed on the surface of the second central portion 401 to form the second anode active material 400. Accordingly, the aqueous dispersion liquid is filtered to obtain the first anode active material 200 and the second anode active material 400 as residues.

It is to be noted that in place of the foregoing one aqueous dispersion liquid, two aqueous dispersion liquids may be used. One aqueous dispersion liquid of the two aqueous dispersion liquids is, for example, a first aqueous dispersion liquid including the first central portion 201 and one or both of the polyacrylate salt and the carboxymethylcellulose salt. The other aqueous dispersion liquid is, for example, a second dispersion liquid including the second central portion 401 and one or both of the polyacrylate salt and the carboxymethylcellulose salt. Accordingly, in the first aqueous dispersion liquid, the first coating portion 202 including one or both of the polyacrylate salt and the carboxymethylcellulose salt is formed on the surface of the first central portion 201. Moreover, in the second aqueous dispersion liquid, the second coating portion 402 including one or both of the polyacrylate salt and the carboxymethylcellulose salt is formed on the surface of the second central portion 401. In this case, it is possible to separately control the thickness of the first coating portion 202 and the thickness of the second coating portion 402. It goes without saying that one or both of the first aqueous dispersion liquid and the second aqueous dispersion liquid may include the hydrogen binding buffer.

Subsequently, the first anode active material 200, the second anode active material 400, the anode binder including one or more of polyvinylidene fluoride, polyimide, and aramid, a nonaqueous solvent, etc. are mixed. Thereafter, a resultant mixture is stirred on an as-needed basis.

Accordingly, the anode binder is dissolved in the nonaqueous solvent to thereby prepare the nonaqueous dispersion liquid including the first anode active material 200, the second anode active material 400, and the anode binder. The state of the nonaqueous dispersion liquid is not particularly limited, but is, for example, a paste state. The paste nonaqueous dispersion liquid is so-called slurry.

Lastly, the anode is manufactured with use of the nonaqueous dispersion liquid. In this case, for example, both surfaces of the anode current collector 1 are coated with the nonaqueous dispersion liquid, and thereafter, the nonaqueous dispersion liquid is dried. Accordingly, the anode active material layers 2 including the first anode active material 200, the second anode active material 400, and the anode binder are formed to thereby complete the anode. It goes without saying that the anode active material layer 2 may be compression-molded on an as-needed basis.

It is to be noted that as with the first embodiment, in place of the filtering method, any other method such as a spray drying method and a pulverizing method may be used to form one or both of the first anode active material 200 and the second anode active material 400. It goes without saying that two or more of methods may be used in combination.

(2-3. Action and Effects)

According to the anode, the first anode active material 200, the second anode active material 400, and the anode binder are included. In the first anode active material 200, the first coating portion 202 including one or both of the polyacrylate salt and the carboxymethylcellulose salt is provided on the surface of the first central portion 201 including the silicon-based material. In the second anode active material 400, the second coating portion 402 including one or both of the polyacrylate salt and the carboxymethylcellulose salt is provided on the surface of the second central portion 401 including the carbon-based material. The anode binder includes one or more of polyvinylidene fluoride, polyimide, and aramid.

In this case, while the binding properties of the first anode active material 200, the second anode active material 400, etc. are secured, each of the first central portion 201 and the second central portion 402 smoothly inserts and extracts the electrode reactant, and decomposition of the electrolytic solution resulting from reactivity of each of the first central portion 201 and the second central portion 401 is suppressed. Accordingly, even if charge and discharge are repeated, the secondary battery is less prone to swell, and discharge capacity is less prone to decrease, which makes it possible to improve battery characteristics of the secondary battery using the anode.

In particular, the first anode active material 200 includes the first coating portion 202, which suppresses decomposition of the electrolytic solution resulting from reactivity of the first central portion 201. Further, the second anode active material 400 includes the second coating portion 402, which suppresses decomposition of the electrolytic solution resulting from reactivity of the second central portion 401. This makes it possible to remarkably suppress decomposition of the electrolytic solution.

In particular, the ratio W2 of one or both of the polyacrylate salt and the carboxymethylcellulose salt is in a range from 0.1 wt % to 4.5 wt % both inclusive, which appropriately controls the coating amount of the first coating portion 202 and appropriately controls the coating amount of the second coating portion 402. Accordingly, ionic conductivity is less prone to decrease on the surface of the first central portion 201, and ionic conductivity is less prone to decrease on the surface of the second central portion 401, which makes it possible to achieve a higher effect.

The thickness of the second coating portion 402 is less than 1 μm, or the coverage of the second coating portion 402 is 50% or more, which makes it possible to achieve a higher effect.

The thickness of the second coating portion 402 is smaller than the thickness of the first coating portion 202, which improves ionic conductivity on the surface of the second central portion 401 and suppresses decomposition of the electrolytic solution on the surface of the first central portion 201. This makes it possible to achieve a higher effect.

The thickness of the first coating portion 202 is smaller than the thickness of the second coating portion 402, which reduces charge-discharge loss of the electrode reactant and suppresses decomposition of the electrolytic solution in a case where the second central portion 401 includes a carbon-based material having low charge-discharge efficiency. This makes it possible to achieve a higher effect.

Moreover, according to the method of manufacturing the anode, the anode is manufactured by the following procedure. The aqueous dispersion liquid that includes the first central portion 201 including the silicon-based material, the second central portion 401 including the carbon-based material, one or both of the polyacrylate salt and the carboxymethylcellulose salt, and the aqueous solvent is prepared. The first anode active material 200 in which the first coating portion 202 including one or both of the polyacrylate salt and the carboxymethylcellulose salt is provided on the surface of the first central portion 201, and the second anode active material 400 in which the second coating portion 402 including one or both of the polyacrylate salt and the carboxymethylcellulose salt is provided on the surface of the second central portion 401 are separated from the aqueous dispersion liquid. The nonaqueous dispersion liquid including first anode active material 200, the second anode active material 400, the anode binder including one or more of polyvinylidene fluoride, polyimide, and aramid, and the nonaqueous solvent is prepared. The nonaqueous dispersion liquid is used to manufacture the anode.

In this case, the anode having the foregoing advantages is manufactured. This makes it possible to improve battery characteristics of the secondary battery using the anode.

3. Secondary Battery and Method of Manufacturing Same

Next, description is given of a secondary battery using the foregoing secondary battery-use anode of the present technology and a method of manufacturing the same.

(3-1. Lithium-Ion Secondary Battery (Cylindrical Type))

Figure 4:
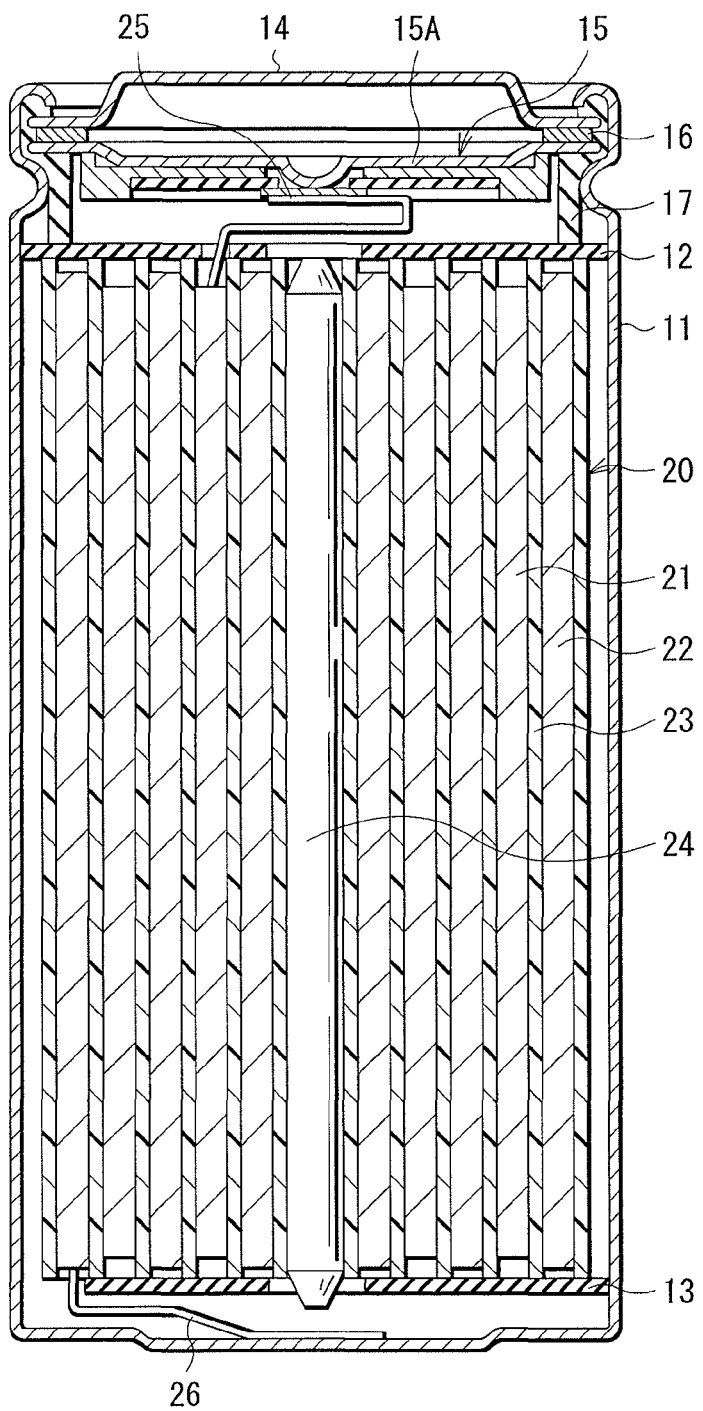
FIG. 4 is a cross-sectional view of a configuration of a secondary battery (cylindrical type) according to an embodiment of the technology.
Figure 5:
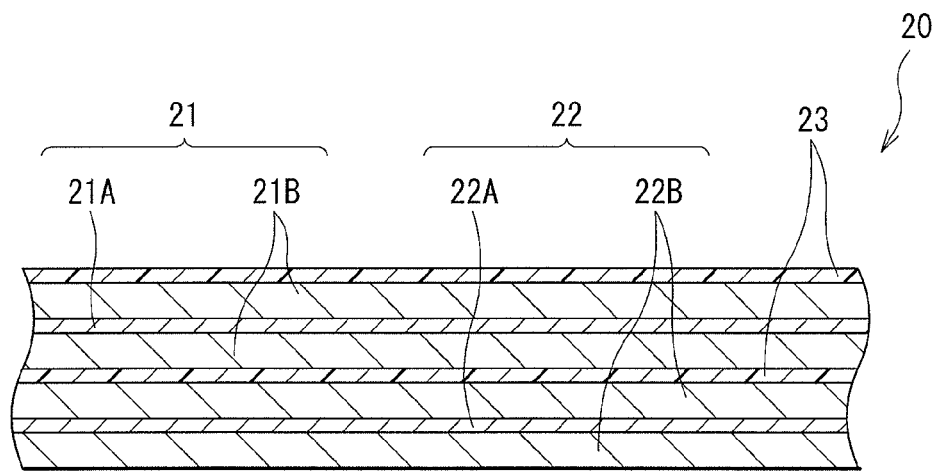
FIG. 5 is a cross-sectional view of part of a spirally wound electrode body illustrated in FIG. 4.

FIG. 4 illustrates a cross-sectional configuration of the secondary battery, and FIG. 5 illustrates a cross-sectional configuration of part of a spirally wound electrode body 20 illustrated in FIG. 4.

The secondary battery described here is, for example, a lithium-ion secondary battery in which capacity of an anode 22 is obtained by insertion and extraction of lithium as the electrode reactant.

[Whole Configuration of Secondary Battery]

The secondary battery has a cylindrical type battery configuration. The secondary battery contain, for example, a pair of insulating plates 12 and 13 and the spirally wound electrode body 20 as a battery element inside a battery can 11 having a substantially hollow cylindrical shape, as illustrated in FIG. 4. In the spirally wound electrode body 20, for example, a cathode 21 and an anode 22 are stacked with a separator 23 in between, and are spirally wound. The spirally wound electrode body 20 is impregnated with, for example, an electrolytic solution that is a liquid electrolyte.

The battery can 11 has, for example, a hollow structure in which one end of the battery can 11 is closed and the other end of the battery can 11 is open. The battery can 11 includes one or more of, for example, iron, aluminum, and an alloy thereof. A surface of the battery can 11 may be plated with, for example, nickel. The pair of insulating plates 12 and 13 are so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 are swaged with a gasket 17, by which the battery can 11 is hermetically sealed. The battery cover 14 includes, for example, a material similar to the material of the battery can 11. Each of the safety valve mechanism 15 and the PTC device 16 is provided on the inner side of the battery cover 14, and the safety valve mechanism 15 is electrically coupled to the battery cover 14 via the PTC device 16. In the safety valve mechanism 15, when an internal pressure reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, electrical resistance of the PTC device 16 increases as a temperature rises. The gasket 17 includes, for example, an insulating material. A surface of the gasket 17 may be coated with, for example, asphalt.

For example, a center pin 24 is inserted in space formed at the center of the spirally wound electrode body 20. However, the center pin 24 may not be inserted. A cathode lead 25 is coupled to the cathode 21, and an anode lead 26 is coupled to the anode 22. The cathode lead 25 includes, for example, a conductive material such as aluminum. For example, the cathode lead 25 is coupled to the safety valve mechanism 15, and is electrically coupled to the battery cover 14. The anode lead 26 includes, for example, a conductive material such as nickel. For example, the anode lead 26 is coupled to the battery can 11, and is electrically coupled to the battery can 11.

[Cathode]

The cathode 21 includes, for example, a cathode current collector 21A and a cathode active material layer 21B provided on the cathode current collector 21A, as illustrated in FIG. 5.

It is to be noted that the cathode active material layer 21B may be provided on a single surface of the cathode current collector 21A, or the cathode active material layers 21B may be provided on both surfaces of the cathode current collector 21A. FIG. 5 illustrates a case where the cathode active material layers 21B are provided on both surfaces of the cathode current collector 21A.

The cathode current collector 21A includes, for example, one or more of conductive materials. The kind of the conductive material is not particularly limited; however, examples of the conductive material include metals material such as aluminum, nickel, and stainless steel, and the conductive material may be an alloy including two or more of the metal materials. The cathode current collector 21A may be configured of a single layer or may be configured of multiple layers.

The cathode active material layer 21B includes, as a cathode active material, one or more of cathode materials that have ability to insert and extract lithium. It is to be noted that the cathode active material layer 21B may further include one or more of other materials such as a cathode binder and a cathode conductor.

The cathode material is preferably one or more of lithium-containing compounds. The kind of the lithium-containing compound is not particularly limited; however, in particular, a lithium-containing composite oxide and a lithium-containing phosphate compound are preferable, which make it possible to achieve high energy density.

The "lithium-containing composite oxide" is an oxide that includes lithium and one or more elements that exclude lithium (hereinafter, referred to as "other elements") as constituent elements. The lithium-containing oxide has, for example, one or more of crystal structures such as a layered rock-salt crystal structure and a spinel crystal structure.

The "lithium-containing phosphate compound" is a phosphate compound that includes lithium and one or more of the other elements as constituent elements. The lithium-containing phosphate compound has, for example, one or more of crystal structures such as an olivine crystal structure.

The kinds of the other elements are not particularly limited, as long as the other elements are one or more of any elements (excluding lithium). In particular, the other elements are preferably one or more of elements that belongs to Groups 2 to 15 in the long form of the periodic table of the elements. More specifically, the other elements more preferably include one or more of metal elements including nickel, cobalt, manganese, and iron, which make it possible to obtain a high voltage.

Examples of the lithium-containing composite oxide having the layered rock-salt crystal structure include compounds represented by the following formulas (1) to (3).

$$Li_aMn_{(1-b-c)}Ni_bM1_cO_{(2-d)}F_d \qquad (1)$$

where M1 is one or more of cobalt, magnesium, aluminum, boron, titanium, vanadium, chromium, iron, copper, zinc, zirconium, molybdenum, tin, calcium, strontium, and tungsten, "a" to "e" satisfy 0.8≤a≤1.2, 0<b<0.5, 0≤c≤0.5, (b+c)<1, −0.1≤d≤0.2, and 0≤e≤0.1, it is to be noted that the composition of lithium varies depending on charge and discharge states, and "a" is a value in a completely-discharged state.

$$Li_aNi_{(1-b)}M2_bO_{(2-c)}F_d \quad (2)$$

where M2 is one or more of cobalt, manganese, magnesium, aluminum, boron, titanium, vanadium, chromium, iron, copper, zinc, molybdenum, tin, calcium, strontium, and tungsten, "a" to "d" satisfy 0.8≤a≤1.2, 0.005≤b≤0.5, −0.1≤c≤0.2, and 0≤d≤0.1, it is to be noted that the composition of lithium varies depending on charge and discharge states, and "a" is a value in a completely-discharged state.

$$Li_aCo_{(1-b)}M3_bO_{(2-c)}F_d \quad (3)$$

where M3 is one or more of nickel, manganese, magnesium, aluminum, boron, titanium, vanadium, chromium, iron, copper, zinc, molybdenum, tin, calcium, strontium, and tungsten, "a" to "d" satisfy 0.8≤a≤1.2, 0≤b≤0.5, −0.1≤c≤0.2, and 0≤d≤0.1, it is to be noted that the composition of lithium varies depending on charge and discharge states, and "a" is a value in a completely-discharged state.

Examples of the lithium-containing composite oxide having the layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It is to be noted that in a case where the lithium-containing composite oxide having the layered rock-salt crystal structure includes nickel, cobalt, manganese, and aluminum as constituent elements, an atomic ratio of nickel is preferably 50 at % or more, which makes it possible to achieve high energy density.

Examples of the lithium-containing composite oxide having the spinel crystal structure include a compound represented by the following formula (4).

$$Li_aMn_{(2-b)}M4_bO_cF_d \quad (4)$$

where M4 is one or more of cobalt, nickel, magnesium, aluminum, boron, titanium, vanadium, chromium, iron, copper, zinc, molybdenum, tin, calcium, strontium, and tungsten, "a" to "d" satisfy 0.9≤a≤1.1, 0≤b≤0.6, 3.7≤c≤4.1, and 0≤d≤0.1, it is to be noted that the composition of lithium varies depending on charge and discharge states, and "a" is a value in a completely-discharged state.

Examples of the lithium-containing composite oxide having the spinel crystal structure include $LiMn_2O_4$.

Examples of the lithium-containing phosphate compound having the olivine crystal structure include a compound represented by the following formula (5).

$$Li_aM5PO_4 \quad (5)$$

where M5 is one or more of cobalt, manganese, iron, nickel, magnesium, aluminum, boron, titanium, vanadium, niobium, copper, zinc, molybdenum, calcium, strontium, tungsten, and zirconium, "a" satisfies 0.9≤a≤1.1, it is to be noted that the composition of lithium varies depending on charge and discharge states, and "a" is a value in a completely-discharged state.

Examples of the lithium-containing phosphate compound having the olivine crystal structure include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, a compound represented by the following formula (6).

$$(Li_2MnO_2)_x(LiMnO_2)_{1-x} \quad (6)$$

where "x" satisfies 0≤x≤1, it is to be noted that the composition of lithium varies depending on charge and discharge states, and "x" is a value in a completely-discharged state.

In addition, the cathode material may be, for example, an oxide, a disulfide, a chalcogenide, or a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

It is to be noted that the cathode material may be any material other than the materials mentioned above.

Details of the cathode binder are similar to details of the foregoing anode binder and other anode binders. Moreover, details of the cathode conductor are similar to the details of the foregoing anode conductor.

[Anode]

The anode 22 has a configuration similar to the foregoing secondary battery-use anode of the present technology.

Specifically, the anode 22 includes, for example, an anode current collector 22A and an anode active material layer 22B provided on the anode current collector 22A, as illustrated in FIG. 5. The configuration of the anode current collector 22A is similar to the configuration of the anode current collector 1, and the configuration of the anode active material layer 22B is similar to the configuration of the anode active material layer 2.

[Separator]

The separator 23 is provided between the cathode 21 and the anode 22. The separator 23 separates the cathode 21 from the anode 22, and passes lithium ions therethrough while preventing current short circuit that results from contact between the cathode 21 and the anode 22.

The separator 23 includes, for example, one or more of porous films such as porous films of a synthetic resin and ceramics. The separator 23 may be a laminated film in which two or more porous films are laminated. Examples of the synthetic resin include polytetrafluoroethylene, polypropylene, and polyethylene.

It is to be noted that the separator 23 may include, for example, the foregoing porous film (a base layer) and a polymer compound layer provided on the base layer. This makes it possible to improve adhesibility of the separator 23 with respect to each of the cathode 21 and the anode 22, thereby suppressing deformation of the spirally wound electrode body 20. This makes it possible to suppress decomposition of the electrolytic solution and to suppress liquid leakage of the electrolytic solution with which the base layer is impregnated. Accordingly, even if charge and discharge are repeated, electrical resistance is less prone to increase, and the secondary battery is less prone to swell.

The polymer compound layer may be provided on only a single surface of the base layer, or the polymer compound layers may be provided on both surfaces of the base layer. The polymer compound layer includes, for example, one or more of polymer materials such as polyvinylidene fluoride. The polyvinylidene fluoride has high physical strength and is electrochemically stable. In order to form the polymer compound layer, for example, the base layer is coated with a solution prepared by dissolving the polymer material in an organic solvent etc., and thereafter, the base layer is dried. Alternatively, the base layer may be immersed in the solution, and thereafter the base layer may be dried.

[Electrolytic Solution]

The electrolytic solution includes, for example, one or more of solvents and one or more of electrolyte salts. It is to be noted that the electrolytic solution may include one or more of various materials such as an additive.

The solvent includes a nonaqueous solvent such as an organic solvent. An electrolytic solution including the nonaqueous solvent is a so-called nonaqueous electrolytic solution.

Examples of the solvents include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Examples of the cyclic carbonate ester include ethylene carbonate, propylene carbonate, and butylene carbonate. Examples of the chain carbonate ester include dimethyl carbonate, diethyl carbonate, ethylmethyl carbonate, and methylpropyl carbonate. Examples of the lactone include γ-butyrolactone and γ-valerolactone. Examples of the chain carboxylate ester include methyl acetate, ethyl acetate, methyl propionate, ethyl propionate, propyl propionate, methyl butyrate, methyl isobutyrate, methyl trimethylacetate, and ethyl trimethylacetate. Examples of the nitrile include acetonitrile, methoxyacetonitrile, and 3-methoxypropionitrile.

In addition, examples of the solvents include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyl oxazolidinone, N,N'-dimethyl imidazolidinone, nitromethane, nitroethane, sulfolane, trimethyl phosphate, and dimethyl sulfoxide, which make it possible to achieve a similar advantage.

In particular, one or more of carbonate esters such as ethylene carbonate, propylene carbonate, dimethyl carbonate, diethyl carbonate, and ethylmethyl carbonate are preferable, which make it possible to achieve, for example, higher battery capacity, superior cycle characteristics, and superior storage characteristics.

In this case, a combination of a high-viscosity (high dielectric constant) solvent (having, for example, specific dielectric constant $\varepsilon \geq 30$) such as ethylene carbonate and propylene carbonate and a low-viscosity solvent (having, for example, viscosity≤1 mPa·s) such as dimethyl carbonate, ethylmethyl carbonate, and diethyl carbonate is more preferable. The combination allows for an improvement in the dissociation property of the electrolyte salt and ion mobility.

Moreover, the solvent may be, for example, an unsaturated cyclic carbonate ester, a halogenated carbonate ester, a sulfonate ester, an acid anhydride, a dinitrile compound, and a diisocyanate compound, which make it possible to improve chemical stability of the electrolytic solution.

The unsaturated cyclic carbonate ester is a cyclic carbonate ester having one or more unsaturated bonds (carbon-carbon double bonds). Examples of the unsaturated cyclic carbonate ester include vinylene carbonate (1,3-dioxol-2-one), vinyl ethylene carbonate (4-vinyl-1,3-dioxolane-2-one), and methylene ethylene carbonate (4-methylene-1,3-dioxolane-2-one). A content of the unsaturated cyclic carbonate ester in the solvent is not particularly limited, but, is, for example, from 0.01 wt % to 10 wt % both inclusive.

The halogenated carbonate ester is a cyclic or chain carbonate ester containing one or more halogens as constituent elements. The kind of halogen is not particularly limited, but is, for example, one or more of elements such as fluorine, chlorine, bromine, and iodine. Examples of the halogenated cyclic carbonate ester include 4-fluoro-1,3-dioxolane-2-one and 4,5-difluoro-1,3-dioxolane-2-one. Examples of the halogenated chain carbonate ester include fluoromethyl methyl carbonate, bis(fluoromethyl) carbonate, and difluoromethyl methyl carbonate. A content of the halogenated carbonate ester in the solvent is not particularly limited, but is, for example, from 0.01 wt % to 50 wt % both inclusive.

Examples of the sulfonate ester include a monosulfonate ester and a disulfonate ester. The monosulfonate ester may be a cyclic monosulfonate ester or a chain monosulfonate ester. Examples of the cyclic monosulfonate ester include sultone such as 1,3-propane sultone and 1,3-propene sultone. Examples of the chain monosulfonate ester include a compound in which a cyclic monosulfonate ester is cleaved at a middle site. The disulfonate ester may be a cyclic disulfonate ester or a chain disulfonate ester. A content of the sulfonate ester in the solvent is not particularly limited, but is, for example, from 0.5 wt % to 5 wt % both inclusive.

Examples of the acid anhydride include a carboxylic anhydride, a disulfonic anhydride, and a carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of a carboxylic-sulfonic anhydride include sulfobenzoic anhydride, sulfopropionic anhydride, and sulfobutyric anhydride. A content of the acid anhydride in the solvent is not particularly limited, but is, for example, from 0.5 wt % to 5 wt % both inclusive.

Examples of the dinitrile compound include a compound represented by NC—$C_mH_{2m}$—CN (where m is an integer of 1 or more). Examples of the dinitrile compound include succinonitrile (NC—$C_2H_4$—CN), glutaronitrile (NC—$C_3H_6$—CN), adiponitrile (NC—$C_4H_8$—CN), and phthalonitrile (NC—$C_6H_4$—CN). A content of the dinitrile compound in the solvent is not particularly limited, but is, for example, from 0.5 wt % to 5 wt % both inclusive.

Examples of the diisocyanate compound include a compound represented by OCN—$CH_{2n}$—NCO (where n is an integer of 1 or more). Examples of the diisocyanate compound include OCN—$C_6H_{12}$—NCO. A content of the diisocyanate compound in the solvent is not particularly limited, but is, for example, from 0.5 wt % to 5 wt % both inclusive.

The electrolyte salt includes, for example, one or more of lithium salts. Note that the electrolyte salt may include a salt other than the lithium salt. Examples of the salt other than lithium include a salt of a light metal other than lithium.

Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), which make it possible to achieve, for example, higher battery capacity, superior cycle characteristics, and superior storage characteristics.

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to decrease internal resistance, thereby achieving a higher effect.

A content of the electrolyte salt is not particularly limited; however, in particular, the content of the electrolyte salt is preferably within a range of 0.3 mol/kg to 3.0 mol/kg both inclusive with respect to the solvent. This makes it possible to achieve high ionic conductivity.

[Operation of Secondary Battery]

The secondary battery operates as follows, for example.

When the secondary battery is charged, lithium ions are extracted from the cathode 21 and the extracted lithium ions are inserted in the anode 22 through the electrolytic solution. In contrast, when the secondary battery is discharged, lithium ions are extracted from the anode 22 and the extracted lithium ions are inserted in the cathode 21 through the electrolytic solution.

[Method of Manufacturing Secondary Battery]

The secondary battery is manufactured by the following procedure, for example.

In a case where the cathode 21 is fabricated, first, the cathode active material, the cathode binder, the cathode conductor, etc. are mixed to obtain a cathode mixture. Subsequently, the cathode mixture is dispersed in, for example, an organic solvent to obtain paste cathode mixture slurry. Next, both surfaces of the cathode current collector 21A are coated with the cathode mixture slurry, and thereafter, the coated cathode mixture slurry is dried to form the cathode active material layers 21B. Thereafter, the cathode active material layers 21B are compression-molded with use of, for example, a roll pressing machine. In this case, the cathode active material layer 21B may be heated, and may be compression-molded a plurality of times.

In a case where the anode 22 is fabricated, the anode active material layers 22B are formed on both surfaces of the anode current collector 22A by a procedure similar to the foregoing method of manufacturing the secondary battery-use anode of the present technology.

In a case where the secondary battery is assembled, the cathode lead 25 is coupled to the cathode current collector 21A by, for example, a welding method, and the anode lead 26 is coupled to the anode current collector 22A by, for example, a welding method. Subsequently, the cathode 21 and the anode 22 are stacked with the separator 23 in between, and are spirally wound to form the spirally wound electrode body 20. Thereafter, the center pin 24 is inserted in the space formed at the center of the spirally wound electrode body 20.

Subsequently, the spirally wound electrode body 20 is sandwiched between the pair of insulating plates 12 and 13, and is contained inside the battery can 11. In this case, the cathode lead 25 is coupled to the safety valve mechanism 15 by, for example, a welding method, and the anode lead 26 is coupled to the battery can 11 by, for example, a welding method. Subsequently, the electrolytic solution is injected inside the battery can 11, and the spirally wound electrode body 20 is impregnated with the injected electrolytic solution. Lastly, the battery cover 14, the safety valve mechanism 15, and the PTC device 16 are swaged with the gasket 17 at the open end of the battery can 11. Thus, the cylindrical type secondary battery is completed.

[Action and Effects]

According to the secondary battery, the anode 22 has a configuration similar to that of the foregoing secondary battery-use anode of the present technology, which makes it possible to achieve superior battery characteristics. Action and effects other than those described above are similar to the action and effects of the secondary battery-use anode of the present technology.

Moreover, according to the method of manufacturing the secondary battery, the anode 22 is manufactured by a method similar to the foregoing method of manufacturing the secondary battery-use anode of the present technology, which makes it possible to achieve superior battery characteristics.

(3-2. Lithium-Ion Secondary Battery (Laminated Film Type))

Figure 6:
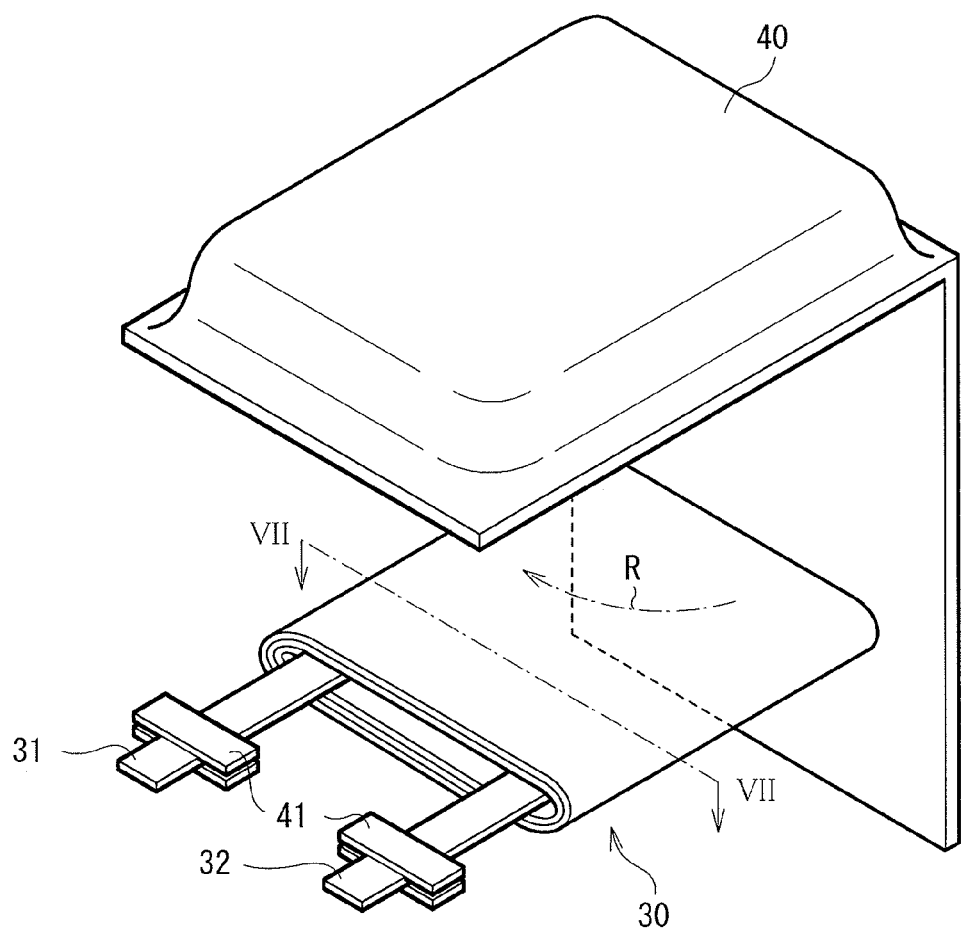
FIG. 6 is a perspective view of a configuration of a secondary battery (laminated film type) according to another embodiment of the present technology.
Figure 7:
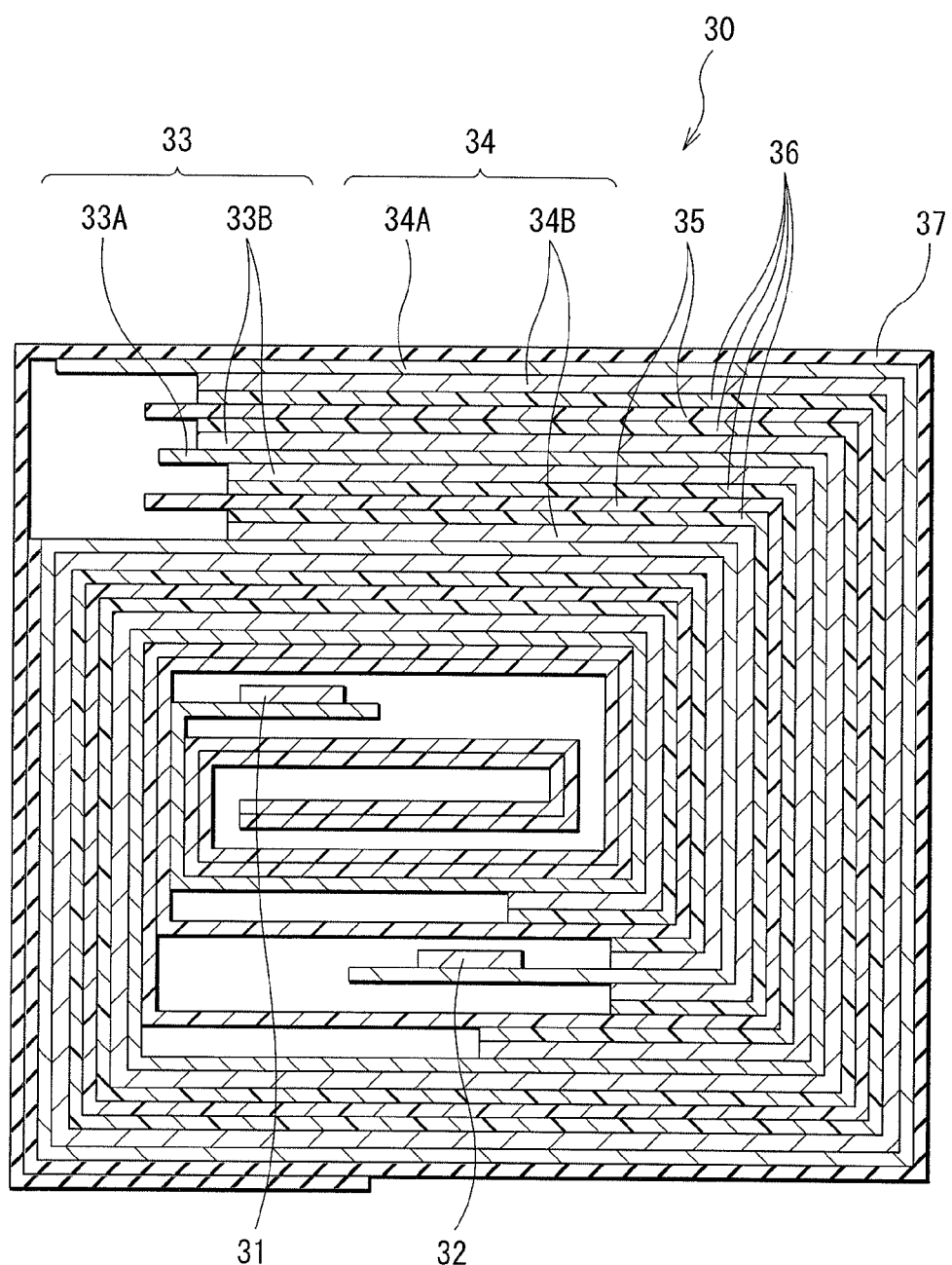
FIG. 7 is a cross-sectional view taken along a line VII-VII of a spirally wound electrode body illustrated in FIG. 6.

FIG. 6 illustrates a perspective configuration of another secondary battery, and FIG. 7 illustrates a cross-section taken along a line VII-VII of a spirally wound electrode body 30 illustrated in FIG. 6. It is to be noted that FIG. 6 illustrates a state in which the spirally wound electrode body 30 and an outer package member 40 are separated from each other.

In the following description, the components of the cylindrical type secondary battery that have been already described are used where appropriate.

[Whole Configuration of Secondary Battery]

The secondary battery is a lithium-ion secondary battery having a laminated film type battery configuration. In the secondary battery, for example, the spirally wound electrode body 30 as a battery element is contained inside the film-like outer package member 40, as illustrated in FIG. 6. In the spirally wound electrode body 30, for example, a cathode 33 and an anode 34 are stacked with a separator 35 and an electrolyte layer 36 in between, and are spirally wound. A cathode lead 31 is coupled to the cathode 33, and an anode lead 32 is coupled to the anode 34. An outermost periphery of the spirally wound electrode body 30 is protected by a protective tape 37.

Each of the cathode lead 31 and the anode lead 32 is led out from inside to outside of the outer package member 40 in a same direction, for example. The cathode lead 31 includes, for example, one or more of conductive materials such as aluminum. The anode lead 32 includes, for example, one or more of conductive materials such as copper, nickel, and stainless steel. These conductive materials have, for example, a thin-plate shape or a mesh shape.

The outer package member 40 is, for example, one film that is foldable in a direction of an arrow R illustrated in FIG. 6, and the outer package member 40 has a depression for containing of the spirally wound electrode body 30 in part thereof. The outer package member 40 is a laminated film in which a fusion bonding layer, a metal layer, and a surface protective layer are laminated in this order, for example. In a process of manufacturing the secondary battery, the outer package member 40 is folded so that portions of the fusion-bonding layer face each other with the spirally wound electrode body 30 in between, and outer edges of the portions of the fusion bonding layer are fusion-bonded. Alternatively, two laminated films bonded to each other by, for example, an adhesive may form the outer package member 40. The fusion bonding layer includes one or more of films such as a polyethylene film and a polypropylene film. The metal layer includes, for example, one or more of an aluminum foil and other metal materials. The surface protective layer includes, for example, one or more of films such as a nylon film and a polyethylene terephthalate film.

In particular, the outer package member 40 is preferably an aluminum laminated film in which a polyethylene film, an aluminum foil, and a nylon film are laminated in this order. Alternatively, the outer package member 40 may be a laminated film having any other laminated structure, a polymer film such as polypropylene, or a metal film.

For example, an adhesive film 41 for prevention of outside air intrusion is inserted between the outer package member 40 and the cathode lead 31. Moreover, for example, the foregoing adhesive film 41 is inserted between the outer package member 40 and the anode lead 32. The adhesive films 41 include a material having adhesibility with respect to both the cathode lead 31 and the anode lead 32. Examples of the material having adhesibility include a polyolefin resin. More specific examples thereof include one or more of polyethylene, polypropylene, modified polyethylene, and modified polypropylene.

[Cathode, Anode, and Separator]

The cathode 33 includes, for example, a cathode current collector 33A and a cathode active material layer 33B. The anode 34 has a configuration similar to that of the foregoing secondary battery-use anode of the present technology, and includes, for example, an anode current collector 34A and an anode active material layer 34B. The configurations of the cathode current collector 33A, the cathode active material layer 33B, the anode current collector 34A, and the anode active material layer 34B are similar to, for example, the configurations of the cathode current collector 21A, the cathode active material layer 21B, the anode current collector 22A, and the anode active material layer 22B, respectively. The configuration of the separator 35 is similar to, for example, the configuration of the separator 23.

The electrolyte layer 36 includes an electrolytic solution and a polymer compound. The configuration of the electrolytic solution is similar to, for example, the configuration of the electrolytic solution used for the foregoing cylindrical type secondary battery. The electrolyte layer 36 described here is a so-called gel electrolyte, and the electrolytic solution is held by the polymer compound. The gel electrolyte achieves high ionic conductivity (for example, 1 mS/cm or more at room temperature), and prevents liquid leakage of the electrolytic solution. It is to be noted that the electrolyte layer 36 may further include one or more of other materials such as an additive.

The polymer material includes, for example, one or more of a homopolymers and copolymers. Examples of the homopolymers include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. Examples of the copolymers include a copolymer of vinylidene fluoride and hexafluoropylene. In particular, polyvinylidene fluoride is preferable as a homopolymer, and a copolymer of vinylidene fluoride and hexafluoropylene is preferable as a copolymer. Such polymer compounds are electrochemically stable.

In the electrolyte layer 36 that is a gel electrolyte, the "solvent" contained in the electrolytic solution refers to a wide concept that encompasses not only a liquid material but also a material having ionic conductivity that has ability to dissociate the electrolyte salt. Hence, in a case where a polymer compound having ionic conductivity is used, the polymer compound is also encompassed by the solvent.

It is to be noted that the electrolytic solution may be used as it is instead of the electrolyte layer 36. In this case, the spirally wound electrode body 30 is impregnated with the electrolytic solution.

[Operation of Secondary Battery]

The secondary battery operates, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 is manufactured, for example, by one of the following three procedures.

In a first procedure, the cathode 33 and the anode 34 are fabricated by a fabrication procedure similar to that of the cathode 21 and the anode 22. Specifically, the cathode 33 is fabricated by forming the cathode active material layers 33B on both surfaces of the cathode current collector 33A, and the anode 34 is fabricated by forming the anode active material layers 34B on both surfaces of the anode current collector 34A. Subsequently, the electrolytic solution, the polymer compound, an organic solvent, etc. are mixed to prepare a precursor solution. Subsequently, the cathode 33 is coated with the precursor solution, and the coated precursor solution is dried to form the gel electrolyte layer 36. Moreover, the anode 34 is coated with the precursor solution, and the coated precursor solution is dried to form the gel electrolyte layer 36. Subsequently, the cathode lead 31 is coupled to the cathode current collector 33A by, for example, a welding method, and the anode lead 32 is coupled to the anode current collector 34A by, for example, a welding method. Subsequently, the cathode 33 and the anode 34 are stacked with the separator 35 in between, and are spirally wound to fabricate the spirally wound electrode body 30. Thereafter, the protective tape 37 is attached onto the outermost periphery of the spirally wound body 30. Subsequently, the outer package member 40 is folded to interpose the spirally wound electrode body 30, and thereafter, the outer edges of the outer package member 40 are bonded by, for example, a thermal fusion bonding method to enclose the spirally wound electrode body 30 in the outer package member 40. In this case, the adhesive film 41 is inserted between the cathode lead 31 and the outer package member 40, and the adhesive film 41 is inserted between the anode lead 32 and the outer package member 40.

In a second procedure, the cathode lead 31 is coupled to the cathode 33 by, for example, a welding method, and the anode lead 32 is coupled to the anode 34 by, for example, a welding method. Subsequently, the cathode 33 and the anode 34 are stacked with the separator 35 in between and are spirally wound to fabricate a spirally wound body as a precursor of the spirally wound electrode body 30. Thereafter, the protective tape 37 is adhered to the outermost periphery of the spirally wound body. Subsequently, the outer package member 40 is folded to interpose the spirally wound body, and thereafter, the outer edges other than one side of the outer package member 40 are bonded by, for example, a thermal fusion bonding method, and the spirally wound body is contained inside a pouch formed of the outer package member 40. Subsequently, the electrolytic solution, monomers that are raw materials of the polymer compound, a polymerization initiator, and, on as-necessary basis, other materials such as a polymerization inhibitor are mixed to prepare a composition for electrolyte. Subsequently, the composition for electrolyte is injected inside the pouch formed of the outer package member 40. Thereafter, the pouch formed of the outer package member 40 is hermetically sealed by, for example, a thermal fusion bonding method. Subsequently, the monomers are thermally polymerized to form the polymer compound. Thus, the electrolytic solution is held by the polymer compound to form the gel electrolyte layer 36.

In a third procedure, the spirally wound body is fabricated, and then contained inside the pouch formed of the outer package member 40 in a manner similar to that of the second procedure described above, except that the separator 35 in which the polymer compound layer is formed on the porous film (the base layer) is used. Subsequently, the electrolytic solution is injected inside the pouch formed of the outer package member 40. Thereafter, an opening of the pouch formed of the outer package member 40 is hermetically sealed by, for example, a thermal fusion bonding method. Subsequently, the outer package member 40 is heated while a weight is applied to the outer package member 40 to cause the separator 35 to be closely attached to the cathode 33 with the polymer compound layer in between and to be closely attached to the anode 34 with the polymer compound layer in between. Thus, each of the polymer compound layers is impregnated with the electrolytic solution, and each of the polymer compound layers is gelated. Thus, the electrolyte layer 36 is formed.

In the third procedure, swollenness of the secondary battery is suppressed more than in the first procedure. Further, in the third procedure, for example, the solvent and the monomers (the raw materials of the polymer compound) are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the secondary battery, the anode 34 has a configuration similar to that of the foregoing secondary battery-use anode of the present technology, which makes it possible to achieve superior battery characteristics. Action and effects other than those described above are similar to the action and effects of the secondary battery-use anode of the present technology.

Moreover, according to the method of manufacturing the secondary battery, the anode 34 is manufactured by a method similar to the foregoing method of manufacturing the secondary battery-use anode, which makes it possible to achieve superior battery characteristics.

(3-3. Lithium Metal Secondary Battery)

A secondary battery described here is a cylindrical type lithium metal secondary battery in which the capacity of the anode 22 is obtained by precipitation and dissolution of lithium metal. The secondary battery has a configuration similar to that of the foregoing cylindrical type lithium-ion secondary battery, and is manufactured by a similar procedure, except that the anode active material layer 22B is made of the lithium metal.

In the secondary battery, the lithium metal is used as an anode active material, and high energy density is thereby achievable. The anode active material layer 22B may exist at the time of assembling, or the anode active material layer 22B may not necessarily exist at the time of assembling and may be made of the lithium metal precipitated during charge. Further, the anode active material layer 22B may be used as a current collector, and the anode current collector 22A may be omitted.

The secondary battery operates, for example, as follows. When the secondary battery is charged, lithium ions are extracted from the cathode 21, and the extracted lithium ions are precipitated as the lithium metal on the surface of the anode current collector 22A through the electrolytic solution. In contrast, when the secondary battery is discharged, the lithium metal is eluded as lithium ions from the anode active material layer 22B, and the lithium ions are inserted in the cathode 21 through the electrolytic solution.

According to the secondary battery, the anode 22 has a configuration similar to that of the foregoing secondary battery-use anode of the present technology, and the anode 33 is manufactured by a method similar to the foregoing method of manufacturing the secondary battery-use anode of the present technology, which make it possible to achieve superior battery characteristics. Action and effects other than those described above are similar to those of the lithium-ion secondary battery.

It is to be noted that the configuration of the lithium metal secondary battery described here is not limited to the cylindrical type secondary battery, and may be applied to a laminated film type secondary battery. Even in this case, similar effects are achievable.

4. Application of Secondary Battery

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source or an auxiliary power source. The main power source is a power source used preferentially irrespective of presence or absence of any other power source. The auxiliary power source is a power source used instead of the main power source or used being switched from the main power source on an as-needed basis. In a case where the secondary battery is used as the auxiliary power source, the kind of the main power source is not limited to the secondary battery.

Examples of the applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include: a mobile lifestyle appliance such as an electric shaver; a storage device such as a backup power source and a memory card; an electric power tool such as an electric drill and an electric saw; a battery pack used as an attachable and detachable power source mounted in, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery is effectively applicable to, for example, the battery pack, the electric vehicle, the electric power storage system, the electric power tool, and the electronic apparatus. In these applications, superior battery characteristics are demanded, and using the secondary battery of the present technology makes it possible to effectively improve performance. It is to be noted that the battery pack is a power source that uses the secondary battery. The battery pack may use a single battery or an assembled battery, as described later. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

(4-1. Battery Pack (Single Battery))

Figure 8:
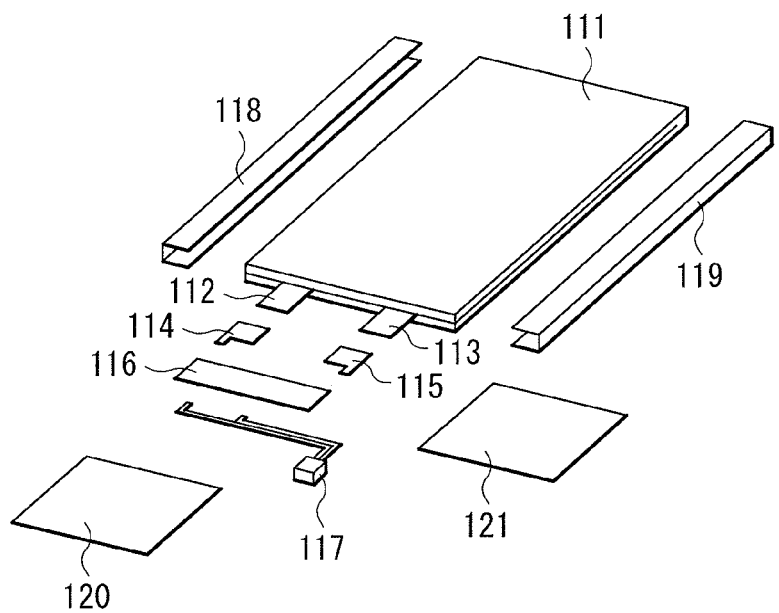
FIG. 8 is a perspective view of a configuration of an application example (a battery pack: single battery) of the secondary battery.
Figure 9:
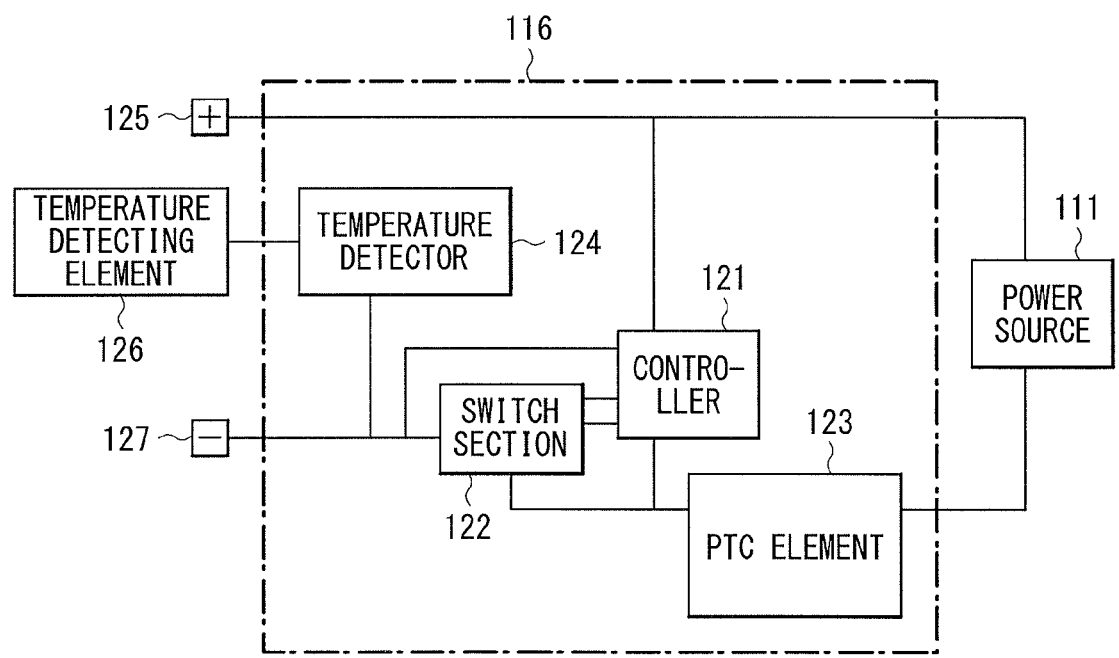
FIG. 9 is a block diagram illustrating a configuration of the battery pack illustrated in FIG. 8.

FIG. 8 illustrates a perspective configuration of a battery pack using a single battery. FIG. 9 illustrates a block configuration of the battery pack illustrated in FIG. 8. It is to be noted that FIG. 8 illustrates the battery pack in an exploded state.

The battery pack described here is a simple battery pack (a so-called soft pack) using one secondary battery of the present technology, and is mounted in, for example, an electronic apparatus typified by a smartphone. For example, the battery pack includes a power source 111 that is the laminated film type secondary battery, and a circuit board 116 coupled to the power source 111, as illustrated in FIG. 8. A cathode lead 112 and an anode lead 113 are attached to the power source 111.

A pair of adhesive tapes 118 and 119 are adhered to both side surfaces of the power source 111. A protection circuit module (PCM) is formed in the circuit board 116. The circuit board 116 is coupled to the cathode lead 112 through a tab 114, and is coupled to the anode lead 113 through a tab 115. Moreover, the circuit board 116 is coupled to a lead 117 provided with a connector for external connection. It is to be noted that while the circuit board 116 is coupled to the power source 111, the circuit board 116 is protected by a label 120 and an insulating sheet 121. The label 120 is adhered to fix, for example, the circuit board 116 and the insulating sheet 121.

Moreover, for example, the battery pack includes the power source 111 and the circuit board 116 as illustrated in FIG. 9. The circuit board 116 includes, for example, a controller 121, a switch section 122, a PTC element 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and includes, for example, a central processing unit (CPU) and a memory.

For example, in a case where a battery voltage reaches an overcharge detection voltage, the controller 121 so causes the switch section 122 to be disconnected that a charge current does not flow into a current path of the power source 111. Moreover, for example, in a case where a large current flows during charge, the controller 121 causes the switch section 122 to be disconnected, thereby blocking the charge current.

In addition, for example, in a case where the battery voltage reaches an overdischarge detection voltage, the controller 121 so causes the switch section 122 to be disconnected that a discharge current does not flow into the current path of the power source 111. Moreover, for example, in a case where a large current flows during discharge, the controller 121 causes the switch section 122 to be disconnected, thereby blocking the discharge current.

It is to be noted that the overcharge detection voltage is, for example, 4.2 V±0.05 V, and the overdischarge detection voltage is, for example, 2.4 V±0.1 V.

The switch section 122 switches the used state of the power source 111, that is, whether the power source 111 is coupled to an external device in accordance with an instruction from the controller 121. The switch section 122 includes, for example, a charge control switch and a discharge control switch. The charge control switch and the discharge control switch each are, for example, a semiconductor switch such as a field-effect transistor using a metal oxide semiconductor (MOSFET). It is to be noted that the charge current and the discharge current are detected on the basis of on-resistance of the switch section 122.

The temperature detector 124 measures a temperature of the power source 111, and outputs a result of the temperature measurement to the controller 121. The temperature detector 124 includes, for example, a temperature detecting element such as a thermistor. It is to be noted that the result of the temperature measurement by the temperature detector 124 is used, for example, in a case where the controller 121 performs charge and discharge control at the time of abnormal heat generation and in a case where the controller 121 performs a correction process at the time of calculating remaining capacity.

It is to be noted that the circuit board 116 may not include the PTC element 123. In this case, a PTC element may be separately attached to the circuit board 116.

(4-2. Battery Pack (Assembled Battery))

Figure 10:
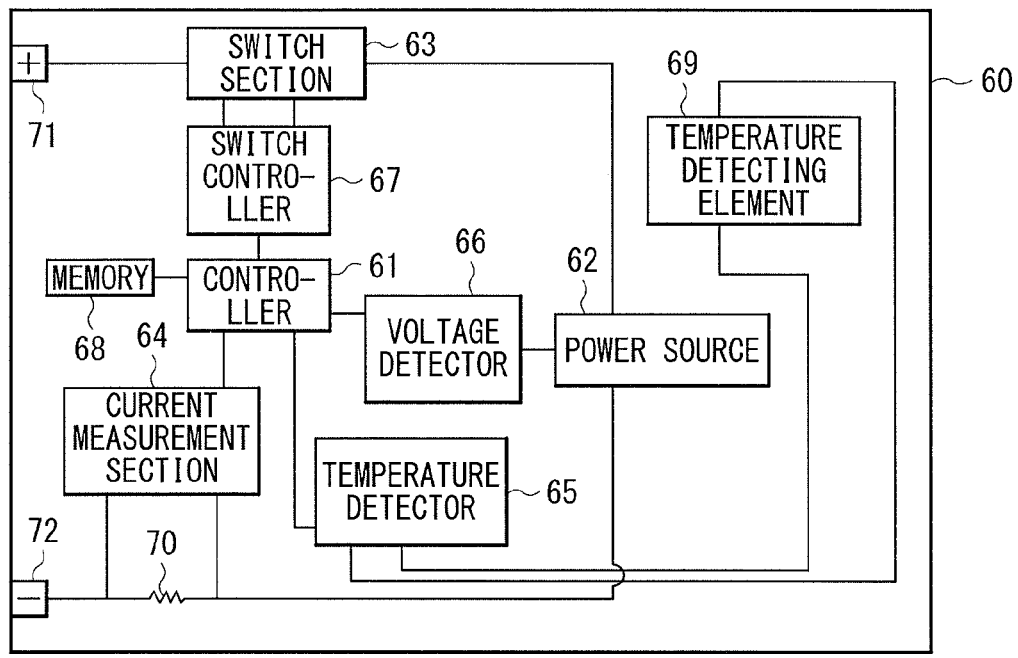
FIG. 10 is a block diagram illustrating a configuration of an application example (a battery pack: assembled battery) of the secondary battery.

FIG. 10 illustrates a block configuration of a battery pack using an assembled battery.

For example, the battery pack includes a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 includes, for example, a plastic material.

The controller 61 controls an operation of the entire battery pack (including a used state of the power source 62). The controller 61 includes, for example, a CPU. The power source 62 includes two or more secondary batteries of the present technology. The power source 62 is, for example, an assembled battery that includes two or more secondary batteries. The secondary batteries may be connected in series, in parallel, or in series-parallel combination. To give an example, the power source 62 includes six secondary batteries in which two sets of series-connected three batteries are connected in parallel to each other.

The switch section 63 switches the used state of the power source 62, that is, whether the power source 62 is coupled to an external device in accordance with an instruction from the controller 61. The switch section 63 includes, for example, a charge control switch, a discharge control switch, a charging diode, and a discharging diode. The charge control switch and the discharge control switch each are, for example, a semiconductor switch such as a field-effect transistor that uses a metal oxide semiconductor (a MOSFET).

The current measurement section 64 measures a current with use of the current detection resistance 70, and outputs a result of the current measurement to the controller 61. The temperature detector 65 measures a temperature with use of the temperature detecting element 69, and outputs a result of the temperature measurement to the controller 61. The result of the temperature measurement is used, for example, in a case where the controller 61 performs charge and discharge control at the time of abnormal heat generation and in a case where the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case where a battery voltage reaches an overcharge detection voltage, the switch controller 67 so causes the switch section 63 (the charge control switch) to be disconnected that a charge current does not flow into a current path of the power source 62. This makes it possible to perform only discharge through the discharging diode in the power source 62. It is to be noted that, for example, in a case where a large current flows during charge, the switch controller 67 blocks the charge current.

Further, for example, in a case where the battery voltage reaches an overdischarge detection voltage, the switch controller 67 so causes the switch section 63 (the discharge control switch) to be disconnected that a discharge current does not flow into the current path of the power source 62. This makes it possible to perform only charge through the charging diode in the power source 62. It is to be noted that, for example, in a case where a large current flows during discharge, the switch controller 67 blocks the discharge current.

It is to be noted that the overcharge detection voltage is, for example, 4.2 V±0.05 V, and the overdischarge detection voltage is, for example, 2.4 V±0.1 V.

The memory 68 is, for example, an EEPROM that is a non-volatile memory. The memory 68 holds, for example, numerical values calculated by the controller 61 and information of the secondary battery measured in a manufacturing process (such as internal resistance in an initial state). It is to be noted that, in a case where the memory 68 holds full charge capacity of the secondary battery, the controller 61 is allowed to comprehend information such as remaining capacity.

The temperature detecting element 69 measures a temperature of the power source 62, and outputs a result of the temperature measurement to the controller 61. The temperature detecting element 69 is, for example, a thermistor.

The cathode terminal 71 and the anode terminal 72 are terminals that are coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

(4-3. Electric Vehicle)

Figure 11:
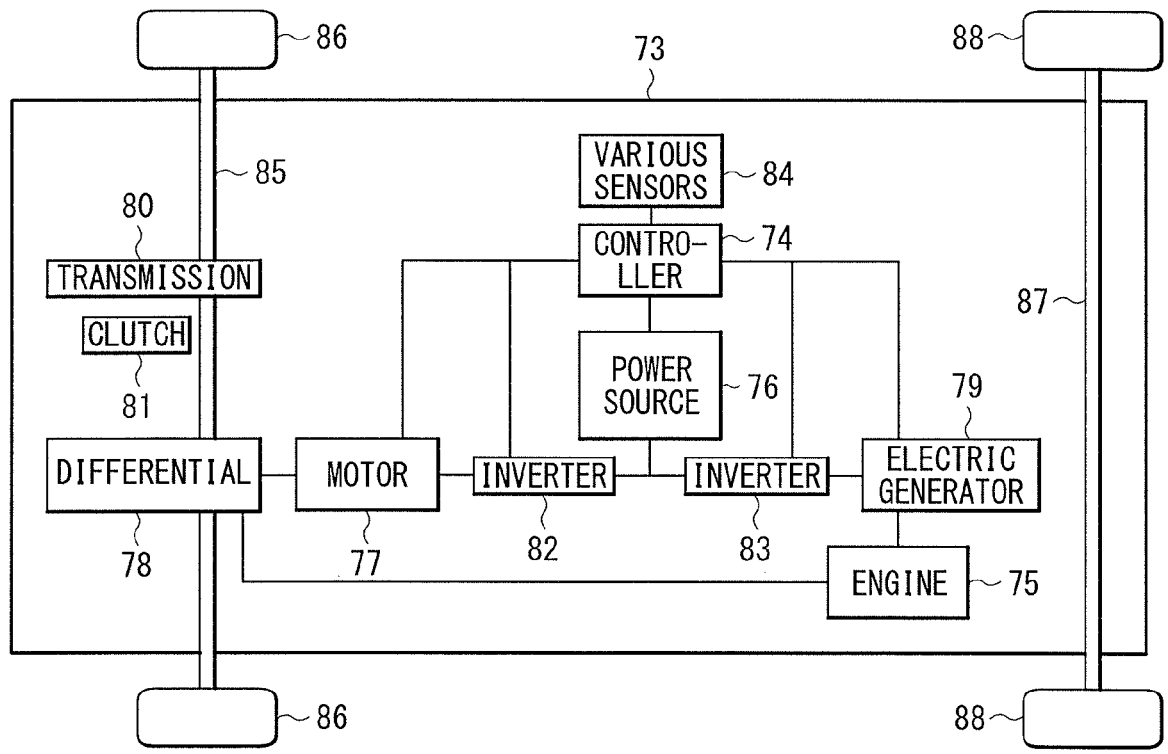
FIG. 11 is a block diagram illustrating a configuration of an application example (an electric vehicle) of the secondary battery.

FIG. 11 illustrates a block configuration of a hybrid automobile that is an example of the electric vehicle.

The electric vehicle includes, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle includes, for example, a front drive shaft 85 and a front tire 86 that are coupled to the differential 78 and the transmission 80, and a rear drive shaft 87, and a rear tire 88.

The electric vehicle is runnable with use of one of the engine 75 and the motor 77 as a drive source, for example. The engine 75 is a main power source, and is, for example, a petrol engine. In a case where the engine 75 is used as the power source, drive power (torque) of the engine 75 is transferred to the front tire 86 or the rear tire 88 via the differential 78, the transmission 80, and the clutch 81 that are drive sections, for example. It is to be noted that the torque of the engine 75 is also transferred to the electric generator 79. Therefore, with use of the torque, the electric generator 79 generates alternating-current electric power, and the generated alternating-current electric power is converted into direct-current electric power via the inverter 83. Thus, the converted direct-current electric power is accumulated in the power source 76. In contrast, in a case where the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 is transferred to the front tire 86 or the rear tire 88 via the differential 78, the transmission 80, and the clutch 81 that are the drive sections, for example.

It is to be noted that, in a case where speed of the electric vehicle is decreased by a brake mechanism, resistance at the time of speed reduction is transferred to the motor 77 as torque; therefore, the motor 77 may generate alternating-current electric power by utilizing the torque. It is preferable that this alternating-current electric power be converted into direct-current electric power via the inverter 82, and the direct-current regenerative electric power be accumulated in the power source 76.

The controller 74 controls an operation of the entire electric vehicle. The controller 74 includes, for example, a CPU. The power source 76 includes one or more secondary batteries of the present technology. The power source 76 is coupled to an external power source, and the power source 76 is allowed to accumulate electric power by receiving electric power supply from the external power source. The various sensors 84 are used, for example, for control of the number of revolutions of the engine 75 and for control of an opening level (a throttle opening level) of a throttle valve. The various sensors 84 include, for example, one or more of sensors such as a speed sensor, an acceleration sensor, and an engine frequency sensor.

It is to be noted that, although the description has been given of the case where the electric vehicle is the hybrid automobile, the electric vehicle may be a vehicle (an electric automobile) that operates with use of only the power source 76 and the motor 77 and without using the engine 75.

(4-4. Electric Power Storage System)

Figure 12:
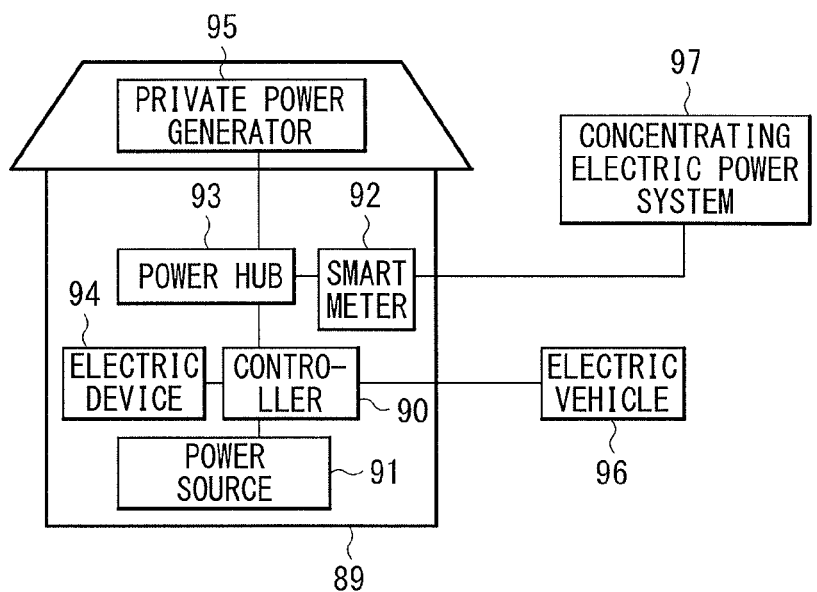
FIG. 12 is a block diagram illustrating a configuration of an application example (an electric power storage system) of the secondary battery.

FIG. 12 illustrates a block configuration of an electric power storage system.

The electric power storage system includes, for example, a controller 90, a power source 91, a smart meter 92, and a power hub 93 inside a house 89 such as a general residence or a commercial building.

In this example, the power source 91 is coupled to an electric device 94 provided inside the house 89 and is allowed to be coupled to an electric vehicle 96 parked outside the house 89, for example. Further, for example, the power source 91 is coupled to a private power generator 95 provided in the house 89 via the power hub 93, and is allowed to be coupled to an outside concentrating electric power system 97 via the smart meter 92 and the power hub 93.

It is to be noted that the electric device 94 includes, for example, one or more home electric products. Examples of the home electric products include a refrigerator, an air conditioner, a television, and a water heater. The private power generator 95 includes, for example, one or more of a solar power generator, a wind power generator, etc. The electric vehicle 96 includes, for example, one or more of an electric automobile, an electric motorcycle, a hybrid automobile, etc. The concentrating electric power system 97 includes, for example, one or more of a thermal power plant, an atomic power plant, a hydraulic power plant, a wind power plant, etc.

The controller 90 controls an operation of the entire electric power storage system (including a used state of the power source 91). The controller 90 includes, for example, a CPU. The power source 91 includes one or more secondary batteries of the present technology. The smart meter 92 is an electric power meter that is compatible with a network and is provided in the house 89 demanding electric power, and is communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power is accumulated in the power source 91 from the concentrating electric power system 97, that is an external power source, via the smart meter 92 and the power hub 93, and electric power is accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, it is possible to accumulate electric power in the power source 91 from the concentrating electric power system 97 in the middle of night when an electric rate is inexpensive, and it is possible to use the electric power accumulated in the power source 91 during daytime hours when the electric rate is expensive.

It is to be noted that the foregoing electric power storage system may be provided for each household (each family unit), or may be provided for a plurality of households (a plurality of family units).

(4-5. Electric Power Tool)

Figure 13:
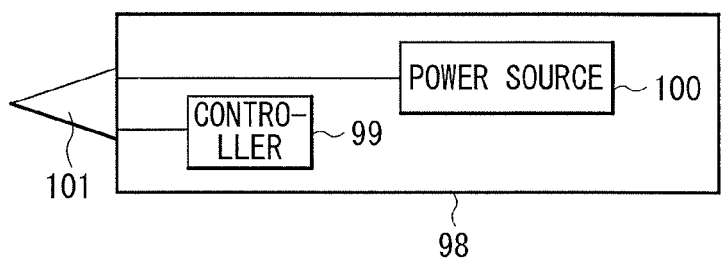
FIG. 13 is a block diagram illustrating a configuration of an application example (an electric power tool) of the secondary battery.

FIG. 13 illustrates a block configuration of an electric power tool.

The electric power tool described here is, for example, an electric drill. The electric power tool includes, for example, a controller 99 and a power source 100 inside a tool body 98. A drill section 101 that is a movable section is attached to the tool body 98 in an operable (rotatable) manner, for example.

The tool body includes, for example, a plastic material. The controller 99 controls an operation of the entire electric power tool (including a used state of the power source 100). The controller 99 includes, for example, a CPU. The power source 100 includes one or more secondary batteries of the present technology. The controller 99 allows electric power to be supplied from the power source 100 to the drill section 101 in accordance with an operation by an operation switch.

EXAMPLES

Examples of the present technology will be described in detail below. The description is given in the following order.

1. Fabrication and Evaluation of Secondary Battery (First Embodiment)

2. Fabrication and Evaluation of Secondary Battery (Second Embodiment)

1. Fabrication and Evaluation of Secondary Battery (First Embodiment

Experimental Examples 1-1 to 1-16

Figure 14:
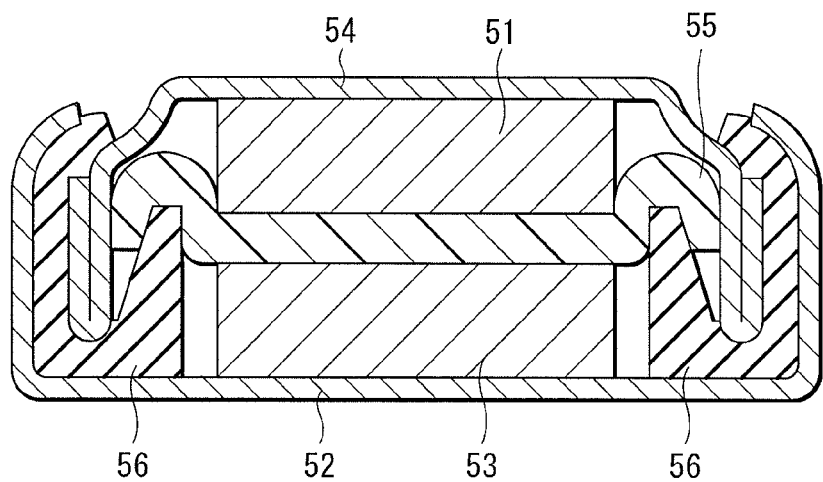
FIG. 14 is a cross-sectional view of a configuration of a test-use secondary battery (coin type).

Secondary batteries were fabricated with use of the first anode active material in which the first coating portion was provided on the surface of the first central portion including a silicon-based material by the following procedure. In this case, coin type lithium-ion secondary batteries illustrated in FIG. 14 were fabricated as test-use secondary batteries.

In each of the secondary batteries, a test electrode 51 contained inside an outer package cup 54 and a counter electrode 53 contained inside an outer package can 52 were stacked with a separator 55 in between, and the outer package can 52 and the outer package cup 54 were swaged with a gasket 56. An electrolyte layer that was a gel electrolyte was interposed between the test electrode 51 and the separator 55, and an electrolyte layer was interposed between the counter electrode 53 and the separator 55 in a similar manner.

The counter electrode 53 was fabricated as follows. First, 98 parts by mass of a cathode active material ($LiCoO_2$), 1 part by mass of a cathode binder (polyvinylidene fluoride), and 1 part by mass of a cathode conductor (ketjen black) were mixed to obtain a cathode mixture. Subsequently, an organic solvent (N-methyl-2-pyrrolidone) and the cathode mixture were mixed, and thereafter, a resultant mixture was stirred (mixed) with use of a planetary centrifugal mixer to obtain paste cathode mixture slurry. Subsequently, both surfaces of a cathode current collector (an aluminum foil having a thickness of 15 μm) were coated with the cathode mixture slurry with use of a coating apparatus, and thereafter, the cathode mixture slurry was dried (at a drying temperature of 120° C.) to form cathode active material layers. Lastly, the cathode active material layers were compression-molded with use of a hand pressing machine, and thereafter, the cathode active material layers were vacuum-dried. In this case, the volume density of the cathode active material layer was 3.7 g/cc (=3.7 $g/cm^3$).

The test electrode 51 was fabricated as follows. First, an aqueous dispersion liquid was prepared. In this case, the first central portion (a silicon-based material), one of a polyacrylate salt aqueous solution and a carboxymethylcellulose salt aqueous solution, and an aqueous solvent (pure water) were mixed, and thereafter, a resultant mixture was stirred with use of a stirrer (for a mixing time of one hour). As the silicon-based material, a simple substance of silicon (Si, with a median diameter D50=3 μm) and an alloy of silicon ($SiTi_{0.01}$, with a median diameter D50=3 μm) were used. As the polyacrylate salt, lithium polyacrylate (LPA), sodium polyacrylate (SPA), and potassium polyacrylate (KPA) were used. As the carboxymethylcellulose salt, carboxymethylcellulose lithium (CMCL) was used. Thus, an aqueous dispersion liquid including the first central portion and one of the polyacrylate salt and the carboxymethylcellulose salt was obtained.

It is to be noted that in a case where the aqueous dispersion liquid was prepared, for comparison, the polyacrylate salt aqueous solution and the carboxymethylcellulose salt aqueous solution were not used. Moreover, for comparison, in place of the polyacrylate salt aqueous solution and the carboxymethylcellulose salt aqueous solution, other materials were used. The other materials were a polyacrylic acid aqueous solution including polyacrylic acid (PA) and a carboxymethylcellulose aqueous solution including carboxymethylcellulose (CMC).

Details such as the composition of the aqueous dispersion liquid, that is, a mixture ratio (wt %) of the respective materials used to prepare the aqueous dispersion liquid were as illustrated in Table 1.

Substantially, the first anode active material was formed with use of a filtering method. In this case, the aqueous dispersion liquid was filtered, and thereafter, a residue was dried (at a drying temperature of 120° C.). Thus, the first coating portion including one of the polyacrylate salt, the carboxymethylcellulose salt, and the other materials was formed on the surface of the first central portion to thereby obtain the first anode active material that was the residue.

In addition, the first anode active material was formed with use of a spray drying (SD) method of a pulverizing method. In a case where the spray drying method was used, the aqueous dispersion liquid was sprayed with use of a spray dryer (available from fujisaki electric Co., Ltd.), and the sprayed aqueous dispersion liquid was dried. In a case where the pulverizing method was used, the aqueous dispersion liquid was dried (at 90° C.), and thereafter, the dried aqueous dispersion liquid was pulverized with use of a planetary ball mill (available from Fritsch Japan Co., Ltd.).

Next, a nonaqueous dispersion liquid was prepared. In this case, the foregoing first anode active material, a second anode active material (meso-carbon microbeads (MCMB) as a carbon-based material, with a median diameter D50=21 μm)), an anode binder, an anode conductor (fibrous carbon), and a nonaqueous solvent (N-methyl-2-pyrrolidone) were mixed, and thereafter, a resultant mixture was stirred with use of a planetary centrifugal mixer (for a stirring time of 15 minutes). As the anode binder, polyvinylidene fluoride (PVDF), polyimide (PI), and aramid (AR) were used. Thus, a nonaqueous dispersion liquid (slurry) including the first anode active material, the second anode active material, the anode binder, and the anode conductor was obtained.

Subsequently, both surfaces of an anode current collector (a copper foil having a thickness of 12 μm) were coated with the nonaqueous dispersion liquid with use of a coating apparatus, and thereafter, the nonaqueous dispersion liquid was dried (at a drying temperature of 120° C.) to form anode active material layers. Lastly, the anode active material layers were compression-molded with use of a hand pressing machine, and thereafter, the anode active material layers were vacuum-dried. In this case, the volume density of the anode active material layer was 1.8 g/cc (=1.8 g/cm$^3$).

TABLE 1

| Experimental Example | First Central Portion | | Polyacrylate Salt | | Carboxymethylcellulose Salt | | Ratio W1 (wt %) | Other Material | |
|---|---|---|---|---|---|---|---|---|---|
| | Kind | Mixture Ratio (wt %) | Kind | Mixture Ratio (wt %) | Kind | Mixture Ratio (wt %) | | Kind | Mixture Ratio (wt %) |
| 1-1 | Si | 95 | LPA | 5 | — | — | 5.3 | — | — |
| 1-2 | Si | 90 | LPA | 10 | — | — | 11.1 | — | — |
| 1-3 | Si | 85 | LPA | 15 | — | — | 17.6 | — | — |
| 1-4 | Si | 80 | LPA | 20 | — | — | 25 | — | — |
| 1-5 | Si | 95 | SPA | 5 | — | — | 5.3 | — | — |
| 1-6 | Si | 95 | KPA | 5 | — | — | 5.3 | — | — |
| 1-7 | Si | 95 | — | — | CMCL | 5 | 5.3 | — | — |
| 1-8 | $SiTi_{0.01}$ | 95 | LPA | 5 | — | — | 5.3 | — | — |
| 1-9 | $SiTi_{0.01}$ | 95 | — | — | CMCL | 5 | 5.3 | — | — |
| 1-14 | Si | 100 | — | — | — | — | — | — | — |
| 1-15 | Si | 95 | — | — | — | — | 5.3 | PA | 5 |
| 1-16 | Si | 95 | — | — | — | — | 5.3 | CMC | 5 |

Details such as the composition of the nonaqueous dispersion liquid, that is, a mixture ratio (wt %) of the respective materials used to prepare the nonaqueous dispersion liquid were as illustrated in Table 2. As a mixture ratio of the anode conductor, a mixture ratio of the fibrous carbon was 1 wt %.

The configuration of the anode active material layers formed with use of the nonaqueous dispersion liquid was as illustrated in Table 2. In a case where the anode active material layers were formed, a mixture ratio of the polyacrylate salt aqueous solution, etc. was changed to adjust a ratio W1 (wt % of solid contents) of the weight of the first coating portion to the weight of the first central portion.

TABLE 2

| Experimental Example | First Anode Active Material | | | | Second Anode Active Material | | Anode Binder | | Cycle Retention Ratio (%) | Load Retention Ratio (%) |
|---|---|---|---|---|---|---|---|---|---|---|
| | First Central Portion | First Coating Portion | Ratio W1 (wt %) | Formation Method | Mixture Ratio (wt %) | Kind | Mixture Ratio (wt %) | Kind | Mixture Ratio (wt %) | |
| 1-1 | Si | LPA | 5.3 | Filtering Method | 10 | MCMB | 86 | PVDF | 3 | 90 | 93 |
| 1-2 | Si | LPA | 11.1 | Filtering Method | 10 | MCMB | 86 | PVDF | 3 | 90 | 91 |
| 1-3 | Si | LPA | 17.6 | Filtering Method | 10 | MCMB | 86 | PVDF | 3 | 86 | 84 |
| 1-4 | Si | LPA | 25 | Filtering Method | 10 | MCMB | 86 | PVDF | 3 | 79 | 76 |
| 1-5 | Si | SPA | 5.3 | Filtering Method | 10 | MCMB | 86 | PVDF | 3 | 88 | 80 |
| 1-6 | Si | KPA | 5.3 | Filtering Method | 10 | MCMB | 86 | PVDF | 3 | 86 | 81 |
| 1-7 | Si | CMCL | 5.3 | Filtering Method | 10 | MCMB | 86 | PVDF | 3 | 88 | 80 |
| 1-8 | $SiTi_{0.01}$ | LPA | 5.3 | Filtering Method | 10 | MCMB | 86 | PVDF | 3 | 91 | 93 |
| 1-9 | $SiTi_{0.01}$ | CMCL | 5.3 | Filtering Method | 10 | MCMB | 86 | PVDF | 3 | 90 | 80 |
| 1-10 | Si | LPA | 5.3 | Filtering Method | 10 | MCMB | 86 | PI | 3 | 92 | 88 |
| 1-11 | Si | LPA | 5.3 | Filtering Method | 10 | MCMB | 86 | AR | 3 | 90 | 88 |
| 1-12 | Si | LPA | 5.3 | SD Method | 10 | MCMB | 86 | PVDF | 3 | 92 | 96 |
| 1-13 | Si | LPA | 5.3 | Pulverizing Method | 10 | MCMB | 86 | PVDF | 3 | 89 | 96 |
| 1-14 | Si | — | — | — | 10 | MCMB | 86 | PVDF | 3 | 68 | 72 |
| 1-15 | Si | PA | 5.3 | Filtering Method | 10 | MCMB | 86 | PVDF | 3 | 61 | 63 |
| 1-16 | Si | CMC | 5.3 | Filtering Method | 10 | MCMB | 86 | PVDF | 3 | 66 | 63 |

In a case where the electrolyte layer was formed, first, a solvent (dimethyl carbonate and 4-fluoro-1,3-dioxolane-2-one) and an electrolyte salt (lithium hexafluorophosphate) were mixed, and thereafter, a resultant mixture was stirred to thereby prepare an electrolytic solution. In this case, a mixture ratio (weight ratio) of the solvent was dimethyl carbonate:4-fluoro-1,3-dioxolane-2-one=95:5. A content of the electrolyte salt was 1 mol/kg with respect to the solvent. Subsequently, the electrolytic solution, a polymer compound (polyvinylidene fluoride), an organic solvent (ethylene carbonate:dimethyl carbonate:propylene carbonate=30:40:30) were mixed, and thereafter, a resultant mixture was stirred to thereby prepare a precursor solution. In this case, a mixture ratio (weight ratio) was the electrolyte salt:the polymer compound:the organic solvent=7:4:89. Lastly, both surfaces of the separator 55 (a microporous polyethylene film having a thickness of 25 μm) was coated with the precursor solution, and thereafter, the precursor solution was dried (at a drying temperature of 70° C.) to thereby form the electrolyte layer.

Each of the secondary batteries was assembled as follows. First, the test electrode 51 was stamped into a pellet shape, and the counter electrode 53 was stamped into a pellet shape. Subsequently, the test electrode 51 and the counter electrode 53 were stacked with the separator 55 on which the electrolyte layer was formed, and thereafter, a resultant stack was subjected to hot pressing (at a heating temperature of 95° C. and a pressing pressure of 1.3 MPa). Lastly, the stack was contained in the outer package cup 54, and the outer package can 52 and the outer package cup 54 were swaged with the gasket 56. Thus, each of the coin type secondary batteries was completed.

Cycle characteristics and load characteristics were examined as battery characteristics of the secondary batteries, and results illustrated in Table 2 were thereby obtained.

To examine the cycle characteristics, first, one cycle of charge and discharge was performed on each of the secondary batteries in an ordinary temperature environment (at 23° C.) to stabilize a battery state of each of the secondary batteries. Subsequently, one cycle of charge and discharge was performed on each of the secondary batteries in the same environment again, and discharge capacity was measured. Thereafter, each of the secondary batteries was charged and discharged in the same environment until the total number of cycles reached 100, and discharge capacity was measured. Lastly, a cycle retention ratio (%)=(discharge capacity at the 100th cycle/discharge capacity at the second cycle)×100 was calculated.

When each of the secondary batteries was charged at the first cycle, each of the secondary batteries was charged at a current of 0.2 C until the voltage reached 4.3 V, and thereafter, each of the secondary batteries was further charged at a voltage of 4.3 V until the current reached 0.025 C. When each of the secondary batteries was discharged at the first cycle, each of the secondary batteries was discharged at a current of 0.2 C until the voltage reached 2.5 V. When each of the secondary batteries was charged at each of the second and subsequent cycles, each of the secondary batteries was charged at a current of 0.5 C until the voltage reached 4.3 V, and thereafter, each of the secondary batteries was further charged at a voltage of 4.3 V until the current reached 0.025 C. When each of the secondary batteries was discharged at each of the second and subsequent cycles, each of the secondary batteries was discharged at a current of 0.5 C until the voltage reached 2.5 V.

It is to be noted that "0.2 C" refers to a current value at which the battery capacity (theoretical capacity) is completely discharged in 5 hours, "0.025 C" refers to a current value at which the battery capacity is completely discharged in 40 hours, and "0.5 C" refers to a current value at which the battery capacity is completely discharged in 2 hours.

The load characteristics were examined as follows. Each of the secondary batteries having a battery state stabilized by a similar procedure to that in the case of examining the cycle characteristics (the secondary batteries having been subjected to one cycle of charge and discharge) was used, and three cycles of charge and discharge were further performed on each of the secondary batteries in an ordinary temperature environment (at 23° C.) while a current during discharge was changed. Hence, discharge capacity at each of the second cycle and the fourth cycle was measured. When each of the secondary batteries was charged at each of the second to fourth cycles, each of the secondary batteries was charged at a current of 0.2 C until the voltage reached 4.3 V, and thereafter, each of the secondary batteries was further charged at a voltage of 4.3 V until the current reached 0.025

C. When each of the secondary batteries was discharged at the second cycle, each of the secondary batteries was discharged at a current of 0.2 C until the voltage reached 2.5 V. When each of the secondary batteries was discharged at the third cycle, each of the secondary batteries was discharged at a current of 0.5 C until the voltage reached 2.5 V. When each of the secondary batteries was discharged at the fourth cycle, each of the secondary batteries was discharged at a current of 2 C until the voltage reached 2.5 V. A load retention ratio (%)=(discharge capacity at the fourth cycle (at a discharge current=2 C)/discharge capacity at the second cycle (at a discharge current=0.2 C))×100 was calculated from these results of the measurement. It is to be noted that "2 C" refers to a current value at which the battery capacity is completely discharged in 0.5 hours.

The cycle retention ratio and the load retention ratio largely varied depending on the configuration of the anode active material layer.

Specifically, in a case where the first coating portion was not provided on the surface of the first central portion (an experimental example 1-14), a sufficient cycle retention ratio was not obtained, and a sufficient load retention ratio was not also obtained.

Moreover, in a case where the first coating portion was provided on the surface of the first central portion and the first coating portion included polyacrylic acid or carboxymethylcellulose (experimental examples 1-15 and 1-16), as compared with a case where the first coating portion was not provided (the experimental example 1-14), each of the cycle retention ratio and the load retention ratio decreased.

In contrast, in a case where the first coating portion was provided on the surface of the first central portion and the first coating portion included the polyacrylate salt or the carboxymethylcellulose salt (experimental examples 1-1 to 1-13), as compared with the case where the first coating portion was not provided (the experimental example 1-14), each of the cycle retention ratio and the load retention ratio increased. This result was similarly obtained without depending on the kind of the silicon-based material, the kind of the polyacrylate salt, the method of forming the first anode active material, the kind of the anode binder, etc.

In this case (the experimental examples 1-1 to 1-13), in particular, in a case where the ratio W1 was less than 20 wt %, each of the cycle retention ratio and the load retention ratio became higher. Moreover, in a case where the spray drying method was used as the method of forming the first anode active material, each of the cycle retention ratio and the load retention ratio became higher.

A reason why these results were obtained is considered as follows. It is to be noted that in the following, the reason is described with reference to the polyacrylic acid and the polyacrylate salt as examples; however, the reason similarly applies to the carboxymethylcellulose salt and carboxymethylcellulose.

In a case where the first coating portion including the polyacrylic acid is provided on the surface of the first central portion, the first coating portion serves as a protective film-cum-binder. Accordingly, the surface of the first central portion is protected from the electrolytic solution by the first coating portion, and the first central portions are bound through the first coating portion. Accordingly, even if charge and discharge are repeated, decomposition of the electrolytic solution resulting from reactivity of the surface of the first central portion is suppressed and a break in the anode active material layer resulting from expansion and contraction of the first central portion is suppressed.

However, the polyacrylic acid exhibits mild acidity, which easily causes a polymer chain to be aggregated in the polyacrylic acid. In this case, it is difficult to sufficiently coat the surface of the first central portion with the polyacrylic acid, which easily causes the electrolytic solution to be decomposed on the surface of the first central portion. Accordingly, each of the cycle retention ratio and the load retention ratio decreases. In addition, the polyacrylic acid having mild acidity causes corrosion of an apparatus used for manufacturing of the secondary battery. Moreover, the polyacrylic acid excessively swells resulting from heat generated in processes of manufacturing the secondary battery, thereby resulting in noticeable deterioration.

In contrast, unlike the foregoing polyacrylic acid, the polyacrylate salt does not exhibit acidity, which makes a polymer chain less prone to be aggregated in the polyacrylate salt. In this case, the surface of the first central portion is easily coated with the polyacrylate salt, which makes the electrolytic solution resistant to decomposition on the surface of the first central portion. Accordingly, each of the cycle retention ratio and the load retention ratio increases. It goes without saying that in this case, the apparatus is resistant to corrosion, and noticeable deterioration is prevented.

2. Fabrication and Evaluation of Secondary Battery (Second Embodiment

Experimental Examples 2-1 to 2-20

Secondary batteries were fabricated and battery characteristics of the secondary batteries were examined in a procedure similar to that in the experimental examples 1-1 to 1-16, except that the second anode active material in which the second coating portion was provided on the surface of the second central portion (a carbon-based material) was used together with the first anode active material in which the first coating portion was provided on the surface of the first central portion (a silicon-based material).

A procedure of fabricating the test electrode 51 was similar to the procedure of fabricating the test electrode 51 described related to the experimental examples 1-1 to 1-16, except for the following description. In a case where the aqueous dispersion liquid was prepared, the first central portion (the silicon-based material), the second central portion (meso-carbon microbeads (MCMB) that was the carbon-based material, with a median diameter D50=21 μm), one of the polyacrylate salt aqueous solution and the carboxymethylcellulose salt aqueous solution, and an aqueous solvent (pure water) were mixed in one container, and thereafter, a resultant mixture was stirred. It is to be noted that in a case where the aqueous dispersion liquid was prepared, for comparison, the polyacrylate salt aqueous solution and the carboxymethylcellulose salt aqueous solution were not used, and other materials (the polyacrylic acid aqueous solution and the carboxymethylcellulose aqueous solution) were used.

Details such as the composition of the aqueous dispersion liquid, that is, a mixture ratio (wt %) of the respective materials used to prepare the aqueous dispersion liquid were as illustrated in Table 3.

Details such as the composition of the nonaqueous dispersion liquid, that is, a mixture ratio (wt %) of the respective materials used to prepare the nonaqueous dispersion liquid were as illustrated in Tables 4 and 5. Note that as the anode conductor, fibrous carbon and carbon black were used. As a mixture ratio of the anode conductor, a mixture ratio of the fibrous carbon was 1.2 wt %, and a mixture ratio of carbon black was 0.5 wt %. Moreover, the configuration of the anode active material layer formed with use of the nonaqueous dispersion liquid was as illustrated in Tables 4 and 5. In a case where the anode active material layer was formed, for example, the mixture ratio of the polyacrylate salt aqueous solution etc. was changed to adjust the ratio W2 (wt % of solid contents) of a total weight of the polyacrylate salt etc. to the weight of the anode active material layer.

TABLE 3

| Experimental Example | First Central Portion Kind | First Central Portion Mixture Ratio (wt %) | Second Central Portion Kind | Second Central Portion Mixture Ratio (wt %) | Polyacrylate Salt Kind | Polyacrylate Salt Mixture Ratio (wt %) | Carboxymethylcellulose Salt Kind | Carboxymethylcellulose Salt Mixture Ratio (wt %) | Other Material Kind | Other Material Mixture Ratio (wt %) |
|---|---|---|---|---|---|---|---|---|---|---|
| 2-1 | Si | 10 | MCMB | 85.2 | SPA | 0.1 | — | — | — | — |
| 2-2 | Si | 10 | MCMB | 85.1 | SPA | 0.2 | — | — | — | — |
| 2-3 | Si | 10 | MCMB | 84.8 | SPA | 0.5 | — | — | — | — |
| 2-4 | Si | 10 | MCMB | 84.5 | SPA | 0.8 | — | — | — | — |
| 2-5 | Si | 10 | MCMB | 82.3 | SPA | 3 | — | — | — | — |
| 2-6 | Si | 10 | MCMB | 82.3 | SPA | 4.5 | — | — | — | — |
| 2-7 | Si | 10 | MCMB | 81.8 | SPA | 5 | — | — | — | — |
| 2-8 | Si | 10 | MCMB | 84.8 | LPA | 0.5 | — | — | — | — |
| 2-9 | Si | 10 | MCMB | 84.8 | KPA | 0.5 | — | — | — | — |
| 2-10 | Si | 10 | MCMB | 84.8 | — | — | CMCL | 0.5 | — | — |
| 2-11 | $SiTi_{0.01}$ | 10 | MCMB | 84.8 | SPA | 0.5 | — | — | — | — |
| 2-16 | Si | 10 | MCMB | 85.3 | — | — | — | — | — | — |
| 2-17 | Si | 10 | MCMB | 85.1 | — | — | — | — | PA | 0.2 |
| 2-18 | Si | 10 | MCMB | 84.7 | — | — | — | — | PA | 0.6 |
| 2-19 | Si | 10 | MCMB | 83.7 | — | — | — | — | PA | 1.6 |
| 2-20 | Si | 10 | MCMB | 84.7 | — | — | — | — | CMC | 0.6 |

TABLE 4

| Experimental Example | First Anode Active Material First Central Portion | First Anode Active Material First Coating Portion | Second Anode Active Material Second Central Portion | Second Anode Active Material Second Coating Portion | Formation Method | Anode Binder Kind | Anode Binder Mixture Ratio (wt %) | Ratio W2 (wt %) | Cycle Retention Ratio (%) | Load Retention Ratio (%) |
|---|---|---|---|---|---|---|---|---|---|---|
| 2-1 | Si | SPA | MCMB | SPA | Filtering Method | PVDF | 3 | 0.1 | 90 | 92 |
| 2-2 | Si | SPA | MCMB | SPA | Filtering Method | PVDF | 3 | 0.2 | 92 | 90 |
| 2-3 | Si | SPA | MCMB | SPA | Filtering Method | PVDF | 3 | 0.5 | 89 | 91 |
| 2-4 | Si | SPA | MCMB | SPA | Filtering Method | PVDF | 3 | 0.8 | 89 | 90 |
| 2-5 | Si | SPA | MCMB | SPA | Filtering Method | PVDF | 3 | 3 | 87 | 88 |
| 2-6 | Si | SPA | MCMB | SPA | Filtering Method | PVDF | 1.5 | 4.5 | 82 | 85 |
| 2-7 | Si | SPA | MCMB | SPA | Filtering Method | PVDF | 1.5 | 5 | 70 | 72 |
| 2-8 | Si | LPA | MCMB | LPA | Filtering Method | PVDF | 3 | 0.5 | 86 | 93 |
| 2-9 | Si | KPA | MCMB | KPA | Filtering Method | PVDF | 3 | 0.5 | 84 | 83 |
| 2-10 | Si | CMCL | MCMB | CMCL | Filtering Method | PVDF | 3 | 0.5 | 89 | 85 |
| 2-11 | $SiTi_{0.01}$ | SPA | MCMB | SPA | Filtering Method | PVDF | 3 | 0.5 | 90 | 93 |
| 2-12 | Si | SPA | MCMB | SPA | Filtering Method | PI | 3 | 0.5 | 90 | 88 |
| 2-13 | Si | SPA | MCMB | SPA | Filtering Method | AR | 3 | 0.5 | 91 | 89 |

TABLE 5

| Experimental Example | First Anode Active Material | | Second Anode Active Material | | Formation Method | Anode Binder | | Ratio W2 (wt %) | Cycle Retention Ratio (%) | Load Retention Ratio (%) |
|---|---|---|---|---|---|---|---|---|---|---|
| | First Central Portion | First Coating Portion | Second Central Portion | Second Coating Portion | | Kind | Mixture Ratio (wt %) | | | |
| 2-14 | Si | SPA | MCMB | SPA | SD Method | PVDF | 3 | 0.5 | 89 | 94 |
| 2-15 | Si | SPA | MCMB | SPA | Pulverizing Method | PVDF | 3 | 0.5 | 89 | 94 |
| 2-16 | Si | — | MCMB | — | — | PVDF | 3 | — | 69 | 72 |
| 2-17 | Si | PA | MCMB | PA | Filtering Method | PVDF | 3 | 0.2 | 66 | 72 |
| 2-18 | Si | PA | MCMB | PA | Filtering Method | PVDF | 3 | 0.6 | 64 | 70 |
| 2-19 | Si | PA | MCMB | PA | Filtering Method | PVDF | 3 | 1.6 | 61 | 62 |
| 2-20 | Si | PA | MCMB | PA | Filtering Method | PVDF | 3 | 0.6 | 63 | 68 |

Battery characteristics (cycle characteristics and load characteristics) of the secondary batteries were examined, and results illustrated in Tables 4 and 5 were thereby obtained.

As can be seen from Tables 4 and 5, even in a case where the second coating portion was provided on the surface of the second central portion, results similar to the foregoing results in Table 2 were obtained.

Specifically, in a case where the first coating portion was not provided on the surface of the first central portion and the second coating portion was not provided on the surface of the second central portion (an experimental example 2-16), a sufficient cycle retention ratio was not obtained, and a sufficient load retention ratio was not also obtained.

Moreover, in a case where the first coating portion was provided on the surface of the first central portion, the second coating portion was provided on the surface of the second central portion, and each of the first coating portion and the second coating portion included the polyacrylic acid or carboxymethylcellulose (experimental examples 2-17 to 2-20), as compared with a case where the first coating portion and the second coating portion were not provided (the experimental example 2-16), the load retention ratio was substantially equal or lower, but the cycle retention ratio decreased.

In contrast, in a case where the first coating portion was provided on the surface of the first central portion, the second coating portion was provided on the surface of the second central portion, and each of the first coating portion and the second coating portion included the polyacrylate salt or the carboxymethylcellulose salt (experimental examples 2-1 to 2-15), as compared with the case where the first coating portion and the second coating portion were not provided (the experimental example 2-16), the load retention ratio was substantially equal or higher, and the cycle retention ratio increased.

In this case (the experimental examples 2-1 to 2-15), in particular, in a case where the ratio W2 was in a range from 0.1 wt % to 4.5 wt % both inclusive, each of the cycle retention ratio and the load retention ratio became higher.

A reason why these results were obtained is considered as follows. Advantages on the basis of the foregoing first coating portion are also obtained in the second coating portion; therefore, decomposition of the electrolytic solution resulting from reactivity on the surface of the first central portion is suppressed, and decomposition of the electrolytic solution resulting from reactivity on the surface of the second central portion is suppressed.

Experimental Examples 3-1 to 3-4

Secondary batteries were fabricated and battery characteristics of the secondary batteries were examined in a procedure similar to that in the experimental examples 2-1 to 2-15, except that the aqueous dispersion liquid included a hydrogen binding buffer or a silane coupling (SC) agent.

In this case, the composition of the aqueous dispersion liquid was changed as illustrated in Table 6, and the configuration of the anode active material layer was changed as illustrated in Table 7. As the hydrogen binding buffer, a sodium borate (SB) aqueous solution was used. As the silane coupling agent, (heptadecafluoro-1,1,2,2-tetrahydrodecyl)-trimethoxysilane (HTS) was used.

TABLE 6

| Experimental Example | First Central Portion | | Second Central Portion | | Polyacrylate Salt | | Hydrogen Binding Buffer | | SC Agent | |
|---|---|---|---|---|---|---|---|---|---|---|
| | Kind | Mixture Ratio (wt %) | Kind | Mixture Ratio (wt %) | Kind | Mixture Ratio (wt %) | Kind | Mixture Ratio (wt %) | Kind | Mixture Ratio (wt %) |
| 3-1 | Si | 10 | MCMB | 84.8 | SPA | 0.3 | SB | 0.2 | — | — |
| 3-2 | Si | 30 | MCMB | 64.1 | SPA | 0.8 | SB | 0.4 | — | — |
| 3-3 | Si | 10 | MCMB | 84.8 | SPA | 0.3 | — | — | HTS | 0.2 |
| 3-4 | Si | 10 | MCMB | 84.3 | SPA | 0.8 | — | — | HTS | 0.2 |

TABLE 7

| Experimental Example | First Anode Active Material | | Second Anode Active Material | | Formation Method | anode binder | | | Cycle Retention Ratio (%) | Load Retention Ratio (%) |
| | First Central Portion | First Coating Portion | Second Central Portion | Second Coating Portion | | Kind | Mixture Ratio (wt %) | Hydrogen Binding Buffer | SC Agent | | |
|---|---|---|---|---|---|---|---|---|---|---|---|
| 3-1 | Si | SPA | MCMB | SPA | Filtering Method | PVDF | 3 | SB | — | 91 | 92 |
| 3-2 | Si | SPA | MCMB | SPA | Filtering Method | PVDF | 3 | SB | — | 92 | 87 |
| 3-3 | Si | SPA | MCMB | SPA | Filtering Method | PVDF | 3 | — | HTS | 93 | 90 |
| 3-4 | Si | SPA | MCMB | SPA | Filtering Method | PVDF | 3 | — | HTS | 93 | 90 |

In a case where the hydrogen binding buffer or the silane coupling agent was used (experimental examples 3-1 to 3-4), as compared with a case where neither the hydrogen binding buffer nor the silane coupling agent was used (experimental examples 2-1 to 2-15), both the cycle retention ratio and the load retention ratio became higher.

As can be seen from Tables 1 to 7, in a case where the anode included the first anode active material (the first central portion including the silicon-based material and the first coating portion including the polyacrylate salt etc.), the second anode active material (the carbon-based material), and the anode binder (such as polyvinylidene fluoride), both cycle characteristics and the load characteristics were improved. Accordingly, superior battery characteristics were achieved in the secondary battery.

Although the present technology has been described above referring to some embodiments and examples, the present technology is not limited thereto, and may be modified in a variety of ways.

Description has been given of the configuration of the secondary battery of the present technology with reference to examples in which the battery structure is of the cylindrical type, the laminated film type, and the coin type, and the battery element has the spirally wound structure. However, the secondary battery of the present technology is similarly applicable also to a case where other battery structure such as that of a square type or a button type is employed, and the secondary battery of the present technology is similarly applicable also to a case where the battery element has other structure such as a stacked structure.

Moreover, application of the anode of the present technology is not limited to the secondary battery, and the anode of the present technology may be applied to other electrochemical devices. Examples of the other electrochemical device include a capacitor.

It is to be noted that the effects described in the present specification are illustrative and non-limiting. The present technology may have effects other than those described in the present specification.

It is to be noted that the present technology may have the following configurations.

(1)

A secondary battery including:

a cathode, an anode, and an electrolytic solution, the anode including a first anode active material, a second anode active material, and an anode binder, the first anode active material including a first central portion and a first coating portion, the first central portion including a material that includes silicon as a constituent element, and the first coating portion being provided on a surface of the first central portion and including one or both of a polyacrylate salt and a carboxymethylcellulose salt, the second anode active material including a material that includes carbon as a constituent element, and the anode binder including one or more of polyvinylidene fluoride, polyimide, and aramid.

(2)

The secondary battery according to (1), in which the polyacrylate salt included in the first coating portion includes one or more of lithium polyacrylate, sodium polyacrylate, and potassium polyacrylate, and the carboxymethylcellulose salt included in the first coating portion includes one or more of carboxymethylcellulose lithium, carboxymethylcellulose sodium, and carboxymethylcellulose potassium.

(3)

The secondary battery according to (1) or (2), in which a specific surface area of the first anode active material is in a range from 0.1 $m^2/g$ to 10 $m^2/g$ both inclusive.

(4)

The secondary battery according to (3), in which the specific surface area of the first anode active material is in a range from 0.5 $m^2/g$ to 1 $m^2/g$ both inclusive.

(5)

The secondary battery according to any one of (1) to (4), in which each of the first anode active material and the second anode active material is in a form of a plurality of particles, a ratio D1/D2 of a median diameter D1 (D50: μm) of the first anode active material to a median diameter D2 (D50: μm) of the second anode active material is in a range from 0.05 to 2 both inclusive, the anode includes an anode active material layer including the first anode active material, the second anode active material, and the anode binder and having a plurality of pores, and a pore diameter at which a change rate of a mercury intrusion amount into the plurality of pores exhibits a peak in measurement of the change rate of the mercury intrusion amount with use of a mercury intrusion technique is in a range from 0.5 μm to 5 μm both inclusive.

(6)

The secondary battery according to any one of (1) to (5), in which a ratio W1 of a weight of the first coating portion to a weight of the first central portion is less than 20 wt %.

(7)

The secondary battery according to any one of (1) to (6), in which the second anode active material includes a second central portion and a second coating portion, the second central portion including a material that includes the carbon as a constituent element, and the second coating portion being provided on a surface of the second central portion and including one or both of a polyacrylate salt and a carboxymethylcellulose salt.

(8)

The secondary battery according to (7), in which the polyacrylate salt included in the second coating portion includes one or more of lithium polyacrylate, sodium polyacrylate, and potassium polyacrylate, and the carboxymethylcellulose salt included in the second coating portion includes one or more of carboxymethylcellulose lithium, carboxymethylcellulose sodium, and carboxymethylcellulose potassium.

(9)

The secondary battery according to (7) or (8), in which the anode includes an anode active material layer including the first anode active material, the second anode active material, and the anode binder, and a ratio W2 of a weight of one or both of the polyacrylate salt and the carboxymethylcellulose included in the anode active material layer to a weight of the anode active material layer is in a range from 0.1 wt % to 4.5 wt % both inclusive.

(10)

The secondary battery according to any one of (7) to (9), in which a thickness of each of the first coating portion and the second coating portion is less than 1 μm.

(11)

The secondary battery according to any one of (7) to (10), in which a coverage of each of the first coating portion and the second coating portion is 50% or more.

(12)

The secondary battery according to any one of (7) to (11), in which a thickness of the first coating portion is smaller than a thickness of the second coating portion, or the thickness of the second coating portion is smaller than the thickness of the first coating portion.

(13)

The secondary battery according to any one of (1) to (12), in which the anode further includes a hydrogen binding buffer that includes one or more of a borate salt, a phosphate salt, and ethanolamine.

(14)

The secondary battery according to any one of (1) to (13), in which the anode includes one or more of a silane coupling agent including an amino group, a silane coupling agent including sulfur as a constituent element, and a silane coupling agent including fluorine as a constituent element.

(15)

The secondary battery according to any one of (1) to (14), in which the secondary battery is a lithium-ion secondary battery.

(16)

A method of manufacturing a secondary battery including, in manufacturing of an anode used for the secondary battery together with a cathode and an electrolytic solution:

preparing an aqueous dispersion liquid including a first central portion, one or both of a polyacrylate salt and carboxymethylcellulose salt, and an aqueous solvent, the first central portion including a material that includes silicon as a constituent element;

separating a first anode active material from the aqueous dispersion liquid, the first anode active material in which a first coating portion including one or both of the polyacrylate salt and the carboxymethylcellulose salt is formed on a surface of the first central portion;

preparing a nonaqueous dispersion liquid including the first anode active material, a second anode active material, an anode binder, and a nonaqueous solvent, the second anode active material including a material that includes carbon as a constituent element, the anode binder including one or more of polyvinylidene fluoride, polyimide, and aramid; and manufacturing the anode with use of the nonaqueous dispersion liquid.

(17)

The method of manufacturing the secondary battery according to (16), in which the aqueous dispersion liquid further includes a second central portion including a material that includes the carbon as a constituent element, the second anode active material is further separated from the aqueous dispersion liquid, the second anode active material in which a second coating portion including one or both of the polyacrylate salt and the carboxymethylcellulose salt is formed on a surface of the second central portion, and the nonaqueous dispersion liquid further includes the second anode active material in which the second coating portion is formed on the surface of the second central portion.

(18)

A secondary battery-use anode including:

a first anode active material, a second anode active material, and an anode binder, the first anode active material including a first central portion and a first coating portion, the first central portion including a material that includes silicon as a constituent element, and the first coating portion being provided on a surface of the first central portion and including one or both of a polyacrylate salt and a carboxymethylcellulose salt, the second anode active material including a material that includes carbon as a constituent element, and the anode binder including one or more of polyvinylidene fluoride, polyimide, and aramid.

(19)

The secondary battery-use anode according to (18), in which the second anode active material includes a second central portion and a second coating portion, the second central portion including a material that includes the carbon as a constituent element, and the second coating portion being provided on a surface of the second central portion and including one or both of a polyacrylate salt and a carboxymethylcellulose salt.

(20)

A method of manufacturing a secondary battery-use anode including, in manufacturing of the anode used for a secondary battery:

preparing an aqueous dispersion liquid including a first central portion, one or both of a polyacrylate salt and carboxymethylcellulose salt, and an aqueous solvent, the first central portion including a material that includes silicon as a constituent element;

separating a first anode active material from the aqueous dispersion liquid, the first anode active material in which a first coating portion including one or both of the polyacrylate salt and the carboxymethylcellulose salt is formed on a surface of the first central portion;

preparing a nonaqueous dispersion liquid including the first anode active material, a second anode active material, an anode binder, and a nonaqueous solvent, the second anode active material including a material that includes carbon as a constituent element, the anode binder including one or more of polyvinylidene fluoride, polyimide, and aramid; and manufacturing the anode with use of the nonaqueous dispersion liquid.

(21)

The method of manufacturing the secondary battery-use anode according to (20), in which the aqueous dispersion liquid further includes a second central portion including a material that includes the carbon as a constituent element, the second anode active material is further separated from the aqueous dispersion liquid, the second anode active material in which a second coating portion including one or both of the polyacrylate salt and the carboxymethylcellulose salt is formed on a surface of the second central portion, and the nonaqueous dispersion liquid further includes the second anode active material in which the second coating portion is formed on the surface of the second central portion.

(22)

A battery pack, including:

the secondary battery according to any one of (1) to (15);

a controller that controls an operation of the secondary battery; and a switch section that switches the operation of the secondary battery in accordance with an instruction from the controller.

(23)

An electric vehicle, including:

the secondary battery according to any one of (1) to (15);

a converter that converts electric power supplied from the secondary battery into drive power;

a drive section that operates in accordance with the drive power; and a controller that controls an operation of the secondary battery.

(24)

An electric power storage system, including:

the secondary battery according to any one of (1) to (15);

one or more electric devices that are supplied with electric power from the secondary battery; and a controller that controls the supplying of the electric power from the secondary battery to the one or more electric devices.

(25)

An electric power tool, including:

the secondary battery according to any one of (1) to (15); and a movable section that is supplied with electric power from the secondary battery.

(26)

An electronic apparatus including the secondary battery according to any one of (1) to (15) as an electric power supply source.

The present application is based on and claims priority from Japanese Patent Application No. 2015-158111 filed in the Japan Patent Office on Aug. 10, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery comprising:
a cathode, an anode, and an electrolytic solution,
the anode including a first anode active material, a second anode active material, and an anode binder,
the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt,
the second anode active material including a material that includes carbon as a constituent element, and
the anode binder including one or more of polyvinylidene fluoride, polyimide, and aramid,
wherein:
a mixing ratio of the first anode active material is smaller than a mixing ratio of the second anode active material,
each of the first anode active material and the second anode active material is in a form of a plurality of particles,
a ratio D1/D2 of a median diameter D1 (D50) of the first anode active material to a median diameter D2 (D50) of the second anode active material is in a range from 0.05 to 2,
the anode includes an anode active material layer including the first anode active material, the second anode active material, and the anode binder and having a plurality of pores, and
a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

2. The secondary battery according to claim 1, wherein
the polyacrylate salt included in the first coating portion includes one or more of lithium polyacrylate, sodium polyacrylate, and potassium polyacrylate, and
the carboxymethylcellulose salt included in the first coating portion includes one or more of carboxymethylcellulose lithium, carboxymethylcellulose sodium, and carboxymethylcellulose potassium.

3. The secondary battery according to claim 1, wherein a specific surface area of the first anode active material is in a range from 0.1 $m^2/g$ to 10 $m^2/g$.

4. The secondary battery according to claim 3, wherein the specific surface area of the first anode active material is in a range from 0.5 $m^2/g$ to 1 $m^2/g$.

5. The secondary battery according to claim 1, wherein a ratio (W1) of a weight of the first coating portion to a weight of the first central portion is less than 20 wt %.

6. The secondary battery according to claim 1, wherein the second anode active material includes a second central portion and a second coating portion, the second central portion including a material that includes the carbon as a constituent element, and the second coating portion being directly disposed on a surface of the second central portion and including one or both of a polyacrylate salt and a carboxymethylcellulose salt.

7. The secondary battery according to claim 6, wherein
the polyacrylate salt included in the second coating portion includes one or more of lithium polyacrylate, sodium polyacrylate, and potassium polyacrylate, and
the carboxymethylcellulose salt included in the second coating portion includes one or more of carboxymethylcellulose lithium, carboxymethylcellulose sodium, and carboxymethylcellulose potassium.

8. The secondary battery according to claim 6, wherein a ratio (W2) of a weight of one or both of the polyacrylate salt and the carboxymethylcellulose salt included in the anode active material layer to a weight of the anode active material layer is in a range from 0.1 wt % to 4.5 wt %.

9. The secondary battery according to claim 6, wherein a thickness of each of the first coating portion and the second coating portion is less than 1 μm.

10. The secondary battery according to claim 6, wherein a coverage of each of the first coating portion and the second coating portion is 50% or more.

11. The secondary battery according to claim 6, wherein
a thickness of the first coating portion is smaller than a thickness of the second coating portion, or
the thickness of the second coating portion is smaller than the thickness of the first coating portion.

12. The secondary battery according to claim 1, wherein the anode further includes a hydrogen binding buffer that includes one or more of a borate salt, a phosphate salt, and ethanolamine.

13. The secondary battery according to claim 1, wherein the anode includes one or more of a silane coupling agent including an amino group, a silane coupling agent including sulfur as a constituent element, and a silane coupling agent including fluorine as a constituent element.

14. The secondary battery according to claim 1, wherein the secondary battery is a lithium-ion secondary battery.

15. The secondary battery according to claim 1, wherein the second anode active material comprises one or more of graphite, pyrolytic carbons, cokes, glassy carbon fibers, an organic polymer compound fired body, activated carbon, and carbon blacks.

16. The secondary battery according to claim 1, wherein the first anode active material comprises $SiO_v (0<v\leq 2)$.

17. The secondary battery according to claim 1, wherein the first central portion is a silicon based material having a mean particle diameter of 1 μm to 10 μm and the second anode active material has a mean particle diameter of 5 μm to 40 μm.

18. The secondary battery according to claim 1, wherein the anode further includes a third anode active material comprising a metal based material, wherein the metal based material comprises one or more of magnesium, boron, aluminum, gallium, indium, silicon, germanium, tin, lead, bismuth, cadmium, silver, zinc, hafnium, zirconium, yttrium, palladium, and platinum.

19. The secondary battery according to claim 1, wherein the first central portion consists essentially of silicon, an alloy of silicon, or a combination thereof.

20. The secondary battery according to claim 1, wherein the first anode active material comprises one or more of Si, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_2Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, and LiSiO.

21. The secondary battery according to claim 1, wherein the first coating portion is in contact with the surface of the first central portion.

22. The secondary battery according to claim 1, wherein a composition of the first anode active material is different than a composition of the second anode active material.

23. The secondary battery according to claim 1, wherein a coverage of the first coating portion is 50% to less than 100%.

24. A secondary battery-use anode comprising:
a first anode active material, a second anode active material, and an anode binder,
the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt,
the second anode active material including a material that includes carbon as a constituent element, and
the anode binder including one or more of polyvinylidene fluoride, polyimide, and aramid,
wherein:
a mixing ratio of the first anode active material is smaller than a mixing ratio of the second anode active material,
each of the first anode active material and the second anode active material is in a form of a plurality of particles,
a ratio D1/D2 of a median diameter D1 (D50) of the first anode active material to a median diameter D2 (D50) of the second anode active material is in a range from 0.05 to 2,
the anode includes an anode active material layer including the first anode active material, the second anode active material, and the anode binder and having a plurality of pores, and
a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

25. The secondary battery-use anode according to claim 24, wherein the second anode active material includes a second central portion and a second coating portion, the second central portion including a material that includes the carbon as a constituent element, and the second coating portion being directly disposed on a surface of the second central portion and including one or both of a polyacrylate salt and a carboxymethylcellulose salt.

26. A battery pack, comprising:
a secondary battery;
a controller that controls an operation of the secondary battery; and
a switch section that switches the operation of the secondary battery in accordance with an instruction from the controller,
the secondary battery including a cathode, an anode, and an electrolytic solution,
the anode including a first anode active material, a second anode active material, and an anode binder,
the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt,
the second anode active material including a material that includes carbon as a constituent element, and
the anode binder including one or more of polyvinylidene fluoride, polyimide, and aramid,
wherein:
a mixing ratio of the first anode active material is smaller than a mixing ratio of the second anode active material,
each of the first anode active material and the second anode active material is in a form of a plurality of particles, a ratio D1/D2 of a median diameter D1 (D50) of the first anode active material to a median diameter D2 (D50) of the second anode active material is in a range from 0.05 to 2, the anode includes an anode active material layer including the first anode active material, the second anode active material, and the anode binder and having a plurality of pores, and a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

27. An electric vehicle, comprising:

a secondary battery;

a converter that converts electric power supplied from the secondary battery into drive power;

a drive section that operates in accordance with the drive power; and a controller that controls an operation of the secondary battery, the secondary battery including a cathode, an anode, and an electrolytic solution, the anode including a first anode active material, a second anode active material, and an anode binder, the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt, the second anode active material including a material that includes carbon as a constituent element, and the anode binder including one or more of polyvinylidene fluoride, polyimide, and aramid, wherein:

a mixing ratio of the first anode active material is smaller than a mixing ratio of the second anode active material, each of the first anode active material and the second anode active material is in a form of a plurality of particles, a ratio D1/D2 of a median diameter D1 (D50) of the first anode active material to a median diameter D2 (D50) of the second anode active material is in a range from 0.05 to 2, the anode includes an anode active material layer including the first anode active material, the second anode active material, and the anode binder and having a plurality of pores, and a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

28. An electric power storage system, comprising:

a secondary battery;

one or more electric devices that are supplied with electric power from the secondary battery; and a controller that controls the supplying of the electric power from the secondary battery to the one or more electric devices, the secondary battery including a cathode, an anode, and an electrolytic solution, the anode including a first anode active material, a second anode active material, and an anode binder, the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt, the second anode active material including a material that includes carbon as a constituent element, and the anode binder including one or more of polyvinylidene fluoride, polyimide, and aramid, wherein:

a mixing ratio of the first anode active material is smaller than a mixing ratio of the second anode active material, each of the first anode active material and the second anode active material is in a form of a plurality of particles, a ratio D1/D2 of a median diameter D1 (D50) of the first anode active material to a median diameter D2 (D50) of the second anode active material is in a range from 0.05 to 2, the anode includes an anode active material layer including the first anode active material, the second anode active material, and the anode binder and having a plurality of pores, and a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

29. An electric power tool, comprising:

a secondary battery; and a movable section that is supplied with electric power from the secondary battery, the secondary battery including a cathode, an anode, and an electrolytic solution, the anode including a first anode active material, a second anode active material, and an anode binder, the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt, the second anode active material including a material that includes carbon as a constituent element, and the anode binder including one or more of polyvinylidene fluoride, polyimide, and aramid, wherein:

a mixing ratio of the first anode active material is smaller than a mixing ratio of the second anode active material, each of the first anode active material and the second anode active material is in a form of a plurality of particles, a ratio D1/D2 of a median diameter D1 (D50) of the first anode active material to a median diameter D2 (D50) of the second anode active material is in a range from 0.05 to 2, the anode includes an anode active material layer including the first anode active material, the second anode active material, and the anode binder and having a plurality of pores, and a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

30. An electronic apparatus comprising a secondary battery as an electric power supply source,
the secondary battery including a cathode, an anode, and an electrolytic solution,
the anode including a first anode active material, a second anode active material, and an anode binder,
the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt,
the second anode active material including a material that includes carbon as a constituent element, and
the anode binder including one or more of polyvinylidene fluoride, polyimide, and aramid,
wherein:
a mixing ratio of the first anode active material is smaller than a mixing ratio of the second anode active material,
each of the first anode active material and the second anode active material is in a form of a plurality of particles,
a ratio D1/D2 of a median diameter D1 (D50) of the first anode active material to a median diameter D2 (D50) of the second anode active material is in a range from 0.05 to 2,
the anode includes an anode active material layer including the first anode active material, the second anode active material, and the anode binder and having a plurality of pores, and
a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

31. A secondary battery comprising:
a cathode, an anode, and an electrolytic solution,
the anode including a first anode active material, a second anode active material, and an anode binder,
the first anode active material including a first central portion and a first coating portion, the first central portion including a material that includes silicon as a constituent element, and the first coating portion being directly disposed on a surface of the first central portion and including one or both of a polyacrylate salt and a carboxymethylcellulose salt,
the second anode active material including a material that includes carbon as a constituent element, and
the anode binder including one or more of polyvinylidene fluoride, polyimide, and aramid,
wherein:
a coverage the first coating portion on the surface of the first central portion is 50% to less than 100% and wherein a thickness of the first coating portion is less than 1 μm,
each of the first anode active material and the second anode active material is in a form of a plurality of particles,
a ratio D1/D2 of a median diameter D1 (D50) of the first anode active material to a median diameter D2 (D50) of the second anode active material is in a range from 0.05 to 2,
the anode includes an anode active material layer including the first anode active material, the second anode active material, and the anode binder and having a plurality of pores, and
a pore diameter at which a change rate of a mercury intrusion amount into the plurality of pores exhibits a peak in measurement of the change rate of the mercury intrusion amount with use of a mercury intrusion technique is in a range from 0.5 μm to 5 μm.

32. The secondary battery according to claim 31, wherein a mixing ratio of the first anode active material is smaller than a mixing ratio of the second anode active material.

\* \* \* \* \*